(12) United States Patent
Gibanel et al.

(10) Patent No.: US 10,829,646 B2
(45) Date of Patent: Nov. 10, 2020

(54) COATING COMPOSITIONS FOR PACKAGING ARTICLES SUCH AS FOOD AND BEVERAGE CONTAINERS

(71) Applicant: SWIMC LLC, Cleveland, OH (US)

(72) Inventors: Sebastien Gibanel, Givry (FR); Benoit Prouvost, L'Abergement de Cuisery (FR)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 16/508,755

(22) Filed: Jul. 11, 2019

(65) Prior Publication Data

US 2019/0338144 A1 Nov. 7, 2019

Related U.S. Application Data

(63) Continuation of application No. 14/902,501, filed as application No. PCT/US2014/045063 on Jul. 1, 2014, now Pat. No. 10,351,714.

(Continued)

(51) Int. Cl.
*C09D 5/02* (2006.01)
*B32B 1/02* (2006.01)
(Continued)

(52) U.S. Cl.
CPC .............. *C09D 5/022* (2013.01); *B05D 1/02* (2013.01); *B05D 1/18* (2013.01); *B05D 1/28* (2013.01);
(Continued)

(58) Field of Classification Search
CPC .......... B32B 1/02; B32B 15/08; B32B 15/082; B32B 15/085; B32B 15/09; B32B 15/095;
(Continued)

(56) References Cited

U.S. PATENT DOCUMENTS 3,297,621 A 1/1967 Taft
3,705,164 A 12/1972 Honig et al.
(Continued)

FOREIGN PATENT DOCUMENTS

CA 2066988 A1 10/1992
CN 1146996 A 4/1997
(Continued)

OTHER PUBLICATIONS

Response to Oral Proceedings including Main Request from European Patent Application No. 11808224.7, dated Dec. 14, 2017, filed Apr. 17, 2018, 48 pp.
(Continued)

*Primary Examiner* — Walter Aughenbaugh
(74) *Attorney, Agent, or Firm* — Shumaker & Sieffert, P.A.

(57) ABSTRACT

An article, comprising a packaging article such as food or beverage container (20), or a portion thereof, that includes a substrate (30, 32) and a coating (34) disposed on at least a portion of the substrate (30, 32). The coating (34) is preferably formed from a coating composition that comprises a latex emulsion having a first-stage copolymer, a second-stage copolymer, and a linkage interconnecting the first-stage copolymer and the second-stage copolymer prior to curing.

23 Claims, 3 Drawing Sheets

Related U.S. Application Data

(60) Provisional application No. 61/842,043, filed on Jul. 2, 2013.

(51) Int. Cl.

| | | |
|---|---|---|
| *B32B 15/08* | (2006.01) | |
| *B32B 15/082* | (2006.01) | |
| *C09D 151/00* | (2006.01) | |
| *B32B 15/085* | (2006.01) | |
| *B32B 15/09* | (2006.01) | |
| *B32B 15/095* | (2006.01) | |
| *B32B 15/098* | (2006.01) | |
| *B65D 25/14* | (2006.01) | |
| *C08F 265/02* | (2006.01) | |
| *C08F 285/00* | (2006.01) | |
| *C08F 290/08* | (2006.01) | |
| *C08F 290/12* | (2006.01) | |
| *B05D 1/02* | (2006.01) | |
| *B05D 1/18* | (2006.01) | |
| *B05D 1/28* | (2006.01) | |

(52) U.S. Cl.
CPC .......... *B32B 1/02* (2013.01); *B32B 15/08* (2013.01); *B32B 15/082* (2013.01); *B32B 15/085* (2013.01); *B32B 15/09* (2013.01); *B32B 15/095* (2013.01); *B32B 15/098* (2013.01); *B65D 25/14* (2013.01); *C08F 265/02* (2013.01); *C08F 285/00* (2013.01); *C08F 290/08* (2013.01); *C08F 290/126* (2013.01); *C09D 151/003* (2013.01); *C09D 151/006* (2013.01)

(58) Field of Classification Search
CPC ...... B32B 15/098; B65D 25/14; C09D 5/022; C09D 151/003; C09D 151/006
See application file for complete search history.

(56) References Cited

U.S. PATENT DOCUMENTS

| | | | |
|---|---|---|---|
| 3,991,216 | A | 11/1976 | Christenson et al. |
| 4,129,712 | A | 12/1978 | Balatan |
| 4,148,670 | A | 4/1979 | Kelly |
| 4,151,143 | A | 4/1979 | Blank et al. |
| 4,198,330 | A | 4/1980 | Kaizerman et al. |
| 4,289,674 | A | 9/1981 | Christenson et al. |
| 4,289,811 | A | 9/1981 | Shelley, Jr. |
| 4,305,859 | A | 12/1981 | McEwan et al. |
| 4,329,266 | A | 5/1982 | Suzuki et al. |
| 4,480,058 | A | 10/1984 | Ting et al. |
| 4,487,859 | A | 12/1984 | Martino |
| 4,499,212 | A | 2/1985 | Martino |
| 4,503,173 | A | 3/1985 | Martino et al. |
| 4,522,961 | A | 6/1985 | Martino et al. |
| 4,547,612 | A | 10/1985 | Tabak |
| 4,567,246 | A | 1/1986 | Gajria et al. |
| 4,647,491 | A | 3/1987 | Ranka et al. |
| 4,692,491 | A | 9/1987 | Ranka et al. |
| 4,894,397 | A | 1/1990 | Morgan et al. |
| 4,948,822 | A | 8/1990 | Iovine et al. |
| 4,948,834 | A | 8/1990 | Baker et al. |
| 4,981,885 | A | 1/1991 | Engel et al. |
| 5,166,272 | A | 11/1992 | Burks et al. |
| 5,173,526 | A | 12/1992 | Vijayendran et al. |
| 5,244,960 | A | 9/1993 | Swarup et al. |
| 5,344,675 | A | 9/1994 | Snyder |
| 5,461,125 | A | 10/1995 | Lu et al. |
| 5,714,539 | A | 2/1998 | Perez et al. |
| 5,786,420 | A | 7/1998 | Grandhee |
| 5,859,112 | A | 1/1999 | Overbeek et al. |
| 5,869,590 | A | 2/1999 | Clark et al. |
| 5,939,482 | A | 8/1999 | Kriessmann et al. |
| 5,962,571 | A | 10/1999 | Overbeck et al. |
| 6,630,707 | B1 | 10/2003 | Shinmori |
| 6,646,041 | B2 | 11/2003 | St. John Williams et al. |
| 6,683,145 | B2 | 1/2004 | Grandhee |
| 6,730,740 | B1 | 5/2004 | Mestach et al. |
| 6,762,240 | B2 | 7/2004 | Swarup et al. |
| 6,872,789 | B2 | 3/2005 | Brinkhuis et al. |
| 6,992,121 | B1 | 1/2006 | Peters et al. |
| 7,001,952 | B2 | 2/2006 | Faler et al. |
| 7,241,830 | B2 | 7/2007 | Kania et al. |
| 7,592,047 | B2 | 9/2009 | O'Brien et al. |
| 8,013,050 | B2 | 9/2011 | Mestach et al. |
| 8,092,876 | B2 | 1/2012 | O'Brien et al. |
| 8,142,868 | B2 | 3/2012 | O'Brien et al. |
| 8,173,265 | B2 | 5/2012 | O'Brien et al. |
| 8,617,663 | B2 | 12/2013 | O'Brien et al. |
| 8,835,012 | B2 | 9/2014 | O'Brien et al. |
| 9,029,470 | B2 | 5/2015 | Rademacher et al. |
| 9,181,448 | B2 | 11/2015 | Li et al. |
| 9,242,763 | B2 | 1/2016 | O'Brien et al. |
| 9,394,456 | B2 | 7/2016 | Rademacher et al. |
| 9,415,900 | B2 | 8/2016 | O'Brien et al. |
| 9,862,854 | B2 | 1/2018 | O'Brien et al. |
| 10,351,714 | B2 | 7/2019 | Gibanel et al. |
| 10,519,337 | B2 | 12/2019 | Gibanel et al. |
| 2002/0155235 | A1 | 10/2002 | Taylor et al. |
| 2003/0153676 | A1 | 8/2003 | Brinkhuis et al. |
| 2006/0100366 | A1 | 5/2006 | O'Brien |
| 2006/0256423 | A1 | 11/2006 | Yamamoto et al. |
| 2007/0043156 | A1 | 2/2007 | Mestach et al. |
| 2009/0014352 | A1 | 1/2009 | Foden |
| 2009/0143528 | A1 | 6/2009 | Mestach et al. |
| 2011/0244134 | A1 | 10/2011 | Dombrowski et al. |
| 2011/0244137 | A1 | 10/2011 | Bober et al. |
| 2012/0077030 | A1 | 3/2012 | Gerst et al. |
| 2012/0145721 | A1 | 6/2012 | Cavallin et al. |
| 2013/0316109 | A1 | 11/2013 | Niederst et al. |
| 2014/0076768 | A1* | 3/2014 | Skillman .............. B65D 25/14 206/524.3 |
| 2017/0029652 | A1 | 2/2017 | O'Brien et al. |

FOREIGN PATENT DOCUMENTS

| | | |
|---|---|---|
| CN | 101040016 A | 9/2007 |
| CN | 100551983 C | 10/2009 |
| CN | 102712727 A | 10/2012 |
| EP | 0256391 A2 | 2/1988 |
| EP | 0308115 A2 | 3/1989 |
| EP | 0379076 A2 | 7/1990 |
| EP | 0389915 A1 | 10/1990 |
| EP | 0747442 A2 | 12/1996 |
| GB | 1421114 A | 1/1976 |
| GB | 1513866 A | 6/1978 |
| GB | 1555868 A | 11/1979 |
| GB | 1574721 A | 9/1980 |
| GB | 2060654 A | 5/1981 |
| GB | 2397578 A | 7/2004 |
| JP | S5339387 U | 4/1978 |
| JP | H0543830 A | 2/1993 |
| JP | 2000080212 A | 3/2000 |
| JP | 2002155234 A | 5/2002 |
| KR | 1020070065879 A | 6/2007 |
| KR | 20130003024 A | 1/2013 |
| WO | 8901498 A1 | 2/1989 |
| WO | 2002026895 A1 | 4/2002 |
| WO | 2002064691 A2 | 8/2002 |
| WO | 2006045017 A1 | 4/2006 |
| WO | 2010097353 A1 | 9/2010 |
| WO | 2011009040 A1 | 1/2011 |
| WO | 2012084973 A1 | 6/2012 |
| WO | 2012089747 A1 | 7/2012 |
| WO | 2012166488 A1 | 12/2012 |
| WO | 2013079718 A1 | 6/2013 |
| WO | 2014186285 A1 | 11/2014 |
| WO | 2015002958 A1 | 1/2015 |
| WO | 2015002961 A1 | 1/2015 |

(56) References Cited

OTHER PUBLICATIONS

"Encyclopedia of Polymer Science and Technology," vol. 1, Wiley-Interscience, ISBN 0-471-28824-1, 2003, 34 pp. (Applicant points out, in accordance with MPEP 609.04(a), that the year of publication, 2003, is sufficiently earlier than the effective U.S. filing date, so that the particular month of publication is not in issue.).
Assuras et al., "New Study Finds that a Chemical Found in Plastic Baby Bottles and Other Plastic Containers and Wraps Could be Dangerous to Your Health," CBS News Worldwide Inc, CBS News Transcripts, May 12, 1999, 1 pp.
Asua et al., "Reactive surfactants in heterophase polymerization," Feature Article, Acta Polym. Wiley Online Library, Dec. 1998, 16 pp.
Buckman et al., "Self-Crosslinking Polymeric Dispersants and Their Use in Emulsion Polymerisation," Proceedings of the Twenty-Ninth International Waterborne, High-Solids, & Powder Coatings Symposium, Feb. 6-8, 2002, 18 pp.
Examination Report from counterpart European Application No. 14741763.8, dated Feb. 22,2019,7 pp.
Examination Report from counterpart European Application No. 14741763.8, dated Jun. 13, 2017, 5 pp.
First Office Action and Search Report, and translation thereof, from counterpart Chinese Application No. 201480038126.6, dated Nov. 1, 2016, 11 pp.
Guerts et al., "Latexes with intrinsic crosslink activity," Progress in Organic Coatings, Elsevier, Nov. 3, 1995, 9 pp.
Hebblethwaite., "Food can coating in falling IQ Scare," Packaging Week, vol. 13, Issue 2, May 15, 1997, 1 pp.
Hileman., "Bisphenol A: Regulatory, Scientific Puzzle," C&EN Washington, Mar. 24, 1997, 3 pp.
Ikezuki et al., "Determination of bisphenol A concentrations in human biological fluids reveals significant early prenatal exposure," Human Reproduction, vol. 17, No. 11, European Society of Human Reproduction and Embryology, Nov. 1, 2002, 3 pp.
International Preliminary Report on Patentability from International Application No. PCT/US2014/045063, dated Jan. 14, 2016, 8 pp.
International Search Report and Written Opinion of International Application No. PCT/US2014/045063, dated Oct. 10, 2014, 10 pp.
Lee et al., "The Formation of 'Inverted' Core-Shell Latexes," Journal of Polymer Science: Polymer Chemistry Edition, vol. 21, Jan. 1983, 8 pp.
Muroi et al., "Morphology of Core-Shell Latex Particles," Journal of Polymer Science: Polymer Chemistry Edition, vol. 22, Nov. 7, 1984, 8 pp.
Notification to Grant, and translation thereof, from counterpart Chinese Application No. 201480038126.6, dated Jun. 1, 2017,13 pp.
Perez., "Study shows Nalgene bottles could prove dangerous.," University Wire, University of Maryland, The Diamondback via U-Wire, Mar. 10, 2004, 2 pp.
Rubin et al., "Perinatal Exposure to Low Doses of Bisphenol A Affects Body Weight, Patterns of Estrous Cyclicity, and Plasma LH Levels," Enviromental Health Perspectives, vol. 109, No. 7, Jul. 2001, 6 pp.
Schlarb et al., "Hydroresin dispersions: new emulsifier free binders for aqueous coatings," Progress in Organic Coatings, Elsevier, Jun. 5, 1995, 9 pp.
Turner et al., "Canmaking, The Technology of Metal Protection and Decoration," Blackie Academic & Professional, ISBN 0751403954, 1998, 66 pp. (Applicant points out, in accordance with MPEP 609.04(a), that the year of publication, 1998, is sufficiently earlier than the effective U.S. filing date, so that the particular month of publication is not in issue.).
Van de Ven et al., "Curing mechanisms and film properties of water-borne isocyanata-free all-acrylic coatings," Double Liaison, 1997, 5 pp. (Applicant points out, in accordance with MPEP 609.04(a), that the year of publication, 1997, is sufficiently earlier than the effective U.S. filing date, so that the particular month of publication is not in issue.).
Walsh, "Dangerious Baby Bottles? Scientists try to determine if clear plastics can do harm," The Patriot Ledger, Aug. 17, 1999, 4 pp.
U.S. Appl. No. 15/862,967 by Valspar Inc. (Inventor: Robert M. O'Brien), filed Jan. 5, 2018.
U.S. Appl. No. 16/690,520, filed Nov. 21, 2019, naming inventors Gibanel et al.
Prosecution History from U.S. Appl. No. 14/902,501, dated Dec. 31, 2015 through Mar. 4, 2019, 47 pp.
Prosecution History from U.S. Appl. No. 14/902,546, dated Dec. 31, 2015 through Oct. 8, 2019, 114 pp.
Second Office Action, and translation thereof, from counterpart Chinese Application No. 201710699525.2, dated Apr. 20, 2020, 10 pp.
Notice of Registration and Notice of Grant, and translation thereof, from counterpart Chinese Application No. 201710699525.2, dated Sep. 3, 2020, 5 pp.

* cited by examiner

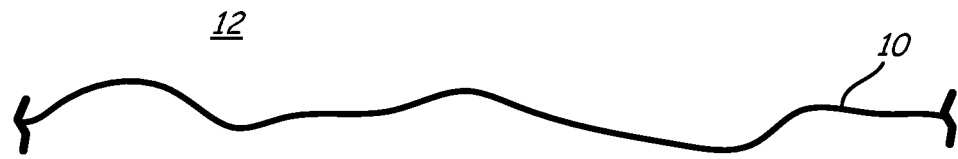
FIG. 1
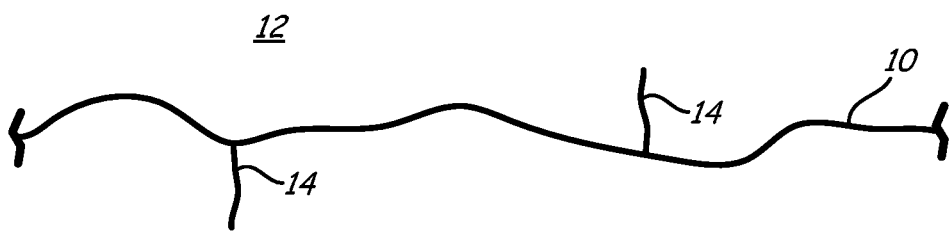
FIG. 2
FIG. 3
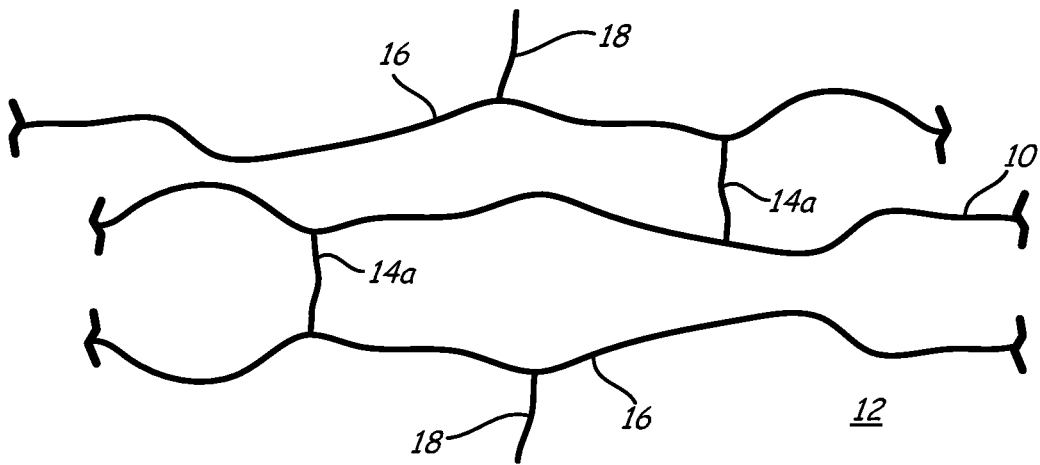

COATING COMPOSITIONS FOR PACKAGING ARTICLES SUCH AS FOOD AND BEVERAGE CONTAINERS

CROSS REFERENCE TO RELATED APPLICATIONS

This application is a continuation of U.S. application Ser. No. 14/902,501, filed Dec. 31, 2015, which is a 371 of International Application PCT/US2014/045063, filed Jul. 1, 2014, which claims the benefit of U.S. Provisional Application No. 61/842,043, filed Jul. 2, 2013, the entire contents of which are incorporated herein by reference.

FIELD

The present disclosure is directed to coating compositions. In particular, the present disclosure is directed to latex emulsion coating compositions, such as for forming coatings for food and beverage containers, as well as other packaging articles.

BACKGROUND

A wide variety of coatings have been used to coat the surfaces of packaging articles (e.g., food and beverage cans). For example, metal cans are sometimes coated using "coil coating" or "sheet coating" operations, i.e., a planar coil or sheet of a suitable substrate (e.g., steel or aluminum metal) is coated with a suitable composition and hardened (e.g., cured). The coated substrate then is formed into the can end or body. Alternatively, liquid coating compositions may be applied (e.g., by spraying, dipping, rolling, etc.) to the formed or partially formed article and then hardened (e.g., cured).

Packaging coatings should preferably be capable of high-speed application to the substrate and provide the necessary properties when hardened to perform in this demanding end use. For example, the coating should be safe for food contact, have excellent adhesion to the substrate, and resist degradation over long periods of time, even when exposed to harsh environments.

Many current packaging coatings contain mobile or bound bisphenol A ("BPA") or aromatic glycidyl ether compounds or PVC compounds. Although the balance of scientific evidence available to date indicates that the small trace amounts of these compounds that might be released from existing coatings does not pose any health risks to humans, some of these compounds are nevertheless perceived by some people as being potentially harmful to human health. From the foregoing, it will be appreciated that what is needed in the art is a packaging container (e.g., a food or beverage can) that is coated with a composition that does not contain extractible quantities of such compounds.

SUMMARY

An aspect of the present disclosure is directed to an article, comprising a packaging article such as a food or beverage container, or a portion thereof. The article includes a substrate, more preferably a metal substrate, and a coating disposed on at least a portion of the substrate. The coating is formed from a coating composition having an emulsion polymerized latex that is a reaction product of a method. The method preferably includes providing a first-stage copolymer having step-growth-functional groups, and grafting a linkage monomer to one of the of the step-growth-functional groups to provide a pendant linkage group. The method also includes emulsion polymerizing a plurality of second-stage monomers in the presence of the first-stage copolymer to form a second-stage copolymer that is covalently attached to the first-stage copolymer. In preferred embodiments, during the emulsion polymerization the pendant linkage group reacts with at least one of the second-stage monomers or a nascent second-stage copolymer to link the second-stage copolymer to the first-stage copolymer.

In another aspect of the present disclosure, the coating composition includes an emulsion polymerized latex having a first-stage copolymer that is emulsion polymerized from first-stage monomers, where the first-stage monomers include monomers having step-growth-functional groups. The emulsion polymerized latex also includes a second-stage copolymer that is emulsion polymerized from second-stage monomers, and a linkage interconnecting the first-stage copolymer and the second-stage copolymer that is preferably formed during emulsion polymerization of the second stage monomers.

Another aspect of the present disclosure is directed to a method of making a coating composition that is suitable for use with food or beverage containers. The method includes providing a first-stage copolymer dispersed in an aqueous carrier, where the first-stage copolymer has step-growth-functional groups. The method also includes reacting one of the step-growth-functional groups of the first-stage copolymer with a complimentary-functional group of a linkage monomer to produce a pendant ethylenically-unsaturated group. The method further includes emulsion polymerizing a plurality of second-stage monomers in the presence of the first-stage copolymer to produce a second-stage copolymer that is linked to the first-stage copolymer by one or more linkages, where preferably at least one of the second-stage monomers and/or the nascent second-stage copolymer reacts with the pendant ethylenically-unsaturated group to link the first-stage copolymer and the second-stage copolymer.

Another aspect of the present disclosure is directed to a method of forming a coating on a food or beverage container. The method includes providing a coating composition having an emulsion polymerized latex, where at least a portion of the latex includes a first-stage copolymer linked to a second-stage copolymer with a copolymer linkage, and where the second-stage copolymer preferably further includes curing groups (e.g., oxirane groups). The method also includes spraying the provided coating composition onto an interior surface of the food or beverage container, and heating the sprayed coating composition to cure the coating composition and form a continuous coating, thereby providing the coating on the interior surface of the food or beverage container.

Another aspect of the present disclosure is directed to a food or beverage container that includes a substrate, more preferably a metal substrate, defining an interior surface of the food or beverage container. The container also includes a coating disposed on the metal substrate and produced from a coating composition, more preferably a liquid coating composition, that includes a latex emulsion copolymer having a first-stage copolymer linked to a second-stage copolymer prior to curing. The coating preferably has a suitable film thickness for use with the metal substrate (e.g., an average film thickness ranging from about 0.7 milligrams/square-inch to about 4.0 milligrams/square-inch) and a high crosslink density.

Definitions

Unless otherwise specified, the following terms as used herein have the meanings provided below:

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

As used herein, the term "organic group" means a hydrocarbon group (with optional elements other than carbon and hydrogen, such as oxygen, nitrogen, sulfur, and silicon) that is classified as an aliphatic group, a cyclic group, or combination of aliphatic and cyclic groups (e.g., alkaryl and aralkyl groups). The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups.

The term "aryl group" (e.g., an arylene group) refers to a closed aromatic ring or ring system such as phenylene, naphthylene, biphenylene, fluorenylene, and indenyl, as well as heteroarylene groups (i.e., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.).

A group that may be the same or different is referred to as being "independently" something.

Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The terms "a", "an", "the", "at least one," and "one or more" are used interchangeably. Thus, for example, reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyester is interpreted to include one or more polymer molecules of the polyester, where the polymer molecules may or may not be identical (e.g., different molecular weights, isomers, etc . . . ).

The term "substantially free" of a particular compound means that the compositions of the present disclosure contain less than 100 parts per million (ppm) of the recited compound. The term "essentially free" of a particular compound means that the compositions of the present disclosure contain less than 10 ppm of the recited compound. The term "essentially completely free" of a particular compound means that the compositions of the present disclosure contain less than 1 ppm of the recited compound. The term "completely free" of a particular compound means that the compositions of the present disclosure contain less than 20 parts per billion (ppb) of the recited compound.

The term "food-contact surface" refers to the substrate surface of a container (typically an inner surface of a food or beverage container) that is in contact with, or intended for contact with, a food or beverage product. By way of example, an interior surface of a metal substrate of a food or beverage container, or a portion thereof, is a food-contact surface even if the interior metal surface is coated with a polymeric coating composition.

The term "on," when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers). Similarly, unless otherwise indicated, the use of a term designating a polymer class such as, for example, "acrylic" is intended to include both homopolymers and copolymers (e.g., polyester-acrylic copolymers).

The terms "comprises" and variations thereof do not have a limiting meaning where these terms appear in the description and claims.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

BRIEF DESCRIPTION OF THE DRAWINGS

FIGS. 1-4 are illustrations of copolymers produced with an example process for forming a coating composition of the present disclosure.

DETAILED DESCRIPTION

Figure 4:
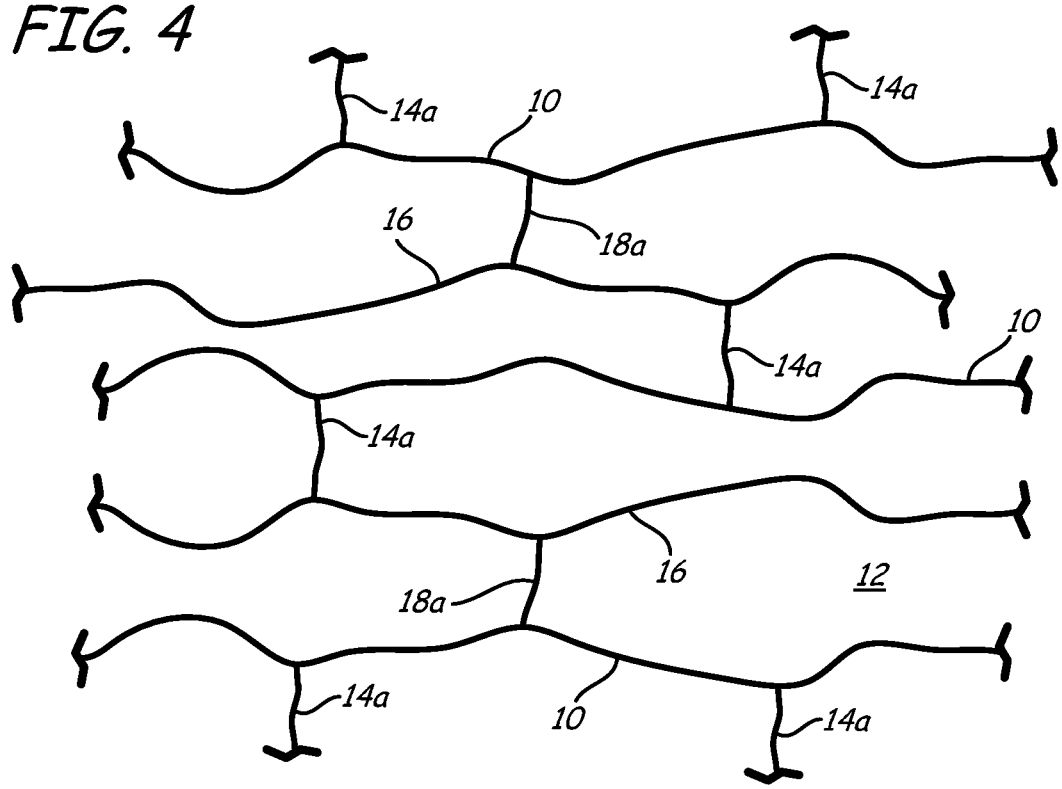

The present disclosure is directed to a latex copolymer, and a related coating composition for use in forming products, such as coatings on substrates. For example, the coating composition may be used to form coatings on metal substrates for containers of food and beverage products (or other packaged products), and methods for producing the coating composition. The present disclosure is also directed to containers having coatings formed from the coating composition, and related methods of application.

The coating composition of the present disclosure includes a latex emulsion, and may optionally be further formulated to include one or more additional additives. The coating composition may also optionally be rheologically modified for different coating applications (e.g., diluted or otherwise configured for spray coating applications).

The latex emulsion of the coating composition preferably includes copolymers that are polymerized in multiple separate polymerization stages, where at least some of the copolymers are connected with linkages prior to curing the coating composition. For ease of discussion, these linkages are referred to hereinafter as "copolymer linkages" to denote that, in preferred embodiments, the linkages generally occur as a result of polymerization of the second-stage monomers. As discussed below, these copolymer linkages can create a partially-crosslinked network of the copolymers for the coating composition, which is believed to enhance sprayability and moisture stability properties.

In addition, the coating composition is believed to produce cured coatings having a desired balance of properties such as, e.g., good adhesion, corrosion resistance, flexibility, and durability, to render the coating composition particularly suitable for forming coatings that can be used in a variety of different products (e.g., packaging containers for food and beverage products). In fact, the coating composition is particularly suitable for use in a spray coating applications to coat interior surfaces of containers for food and beverage products, including food and beverage products that are chemically aggressive.

The latex emulsion is preferably produced in a multiple-stage process, which may be based on an "inverted core-shell" polymerization process, and which is discussed in more detail below. Briefly, the first-stage polymerization preferably involves emulsion and/or solution polymerizing first-stage monomers to produce first-stage copolymers. In preferred embodiments, the first-stage copolymer is an emulsion polymerized or solution polymerized acrylic polymer. It is contemplated, however, that any suitable polymer or copolymer or combination of polymers may be used such as, for example, water-dispersible polyesters, alkyds, polyurethanes, and copolymers thereof (e.g., water-dispersible polyester-acrylates, polyester-urethanes, etc.). In preferred embodiments, the first-stage copolymers are emulsion polymerized in an aqueous carrier, which is believed to produce copolymers having higher molecular weights (as compared, e.g., to solution polymerized copolymers). However, in alternative embodiments, the first-stage copolymers may be solution polymerized in an organic solvent solution, and then transferred to the aqueous carrier.

For example, as shown in FIG. 1, the first-stage polymerization may produce a first-stage copolymer 10 dispersed in an aqueous carrier 12, optionally with one or more surfactants (not shown). Following the first-stage polymerization, one or more linkage monomers may be grafted to the first-stage copolymers using one or more step-growth reactions to provide one or more linkage groups, such as linkage groups 14 shown in FIG. 2.

From there, a second-stage polymerization may be conducted, where second-stage monomers may be emulsion polymerized in the presence of the first-stage copolymers. This produces second-stage copolymers, such as second-stage copolymers 16 shown in FIG. 3, where at least a portion of the second-stage copolymers are preferably linked to the first-stage copolymers via the linkage groups 14 to form copolymer linkages, such as copolymer linkages 14a shown in FIG. 3. This produces the partially-crosslinked network of the copolymers in the aqueous carrier.

Additionally, the second stage copolymers may include curing groups, such as curing groups 18 shown in FIG. 3. These curing groups are preferably functional groups that graft to the first-stage copolymers during a subsequent curing step—typically via reaction with a complementary functional group present on the first-stage copolymer. As shown in FIG. 4, this forms cured linkages 18a, which can further crosslink the first-stage copolymers and the second-stage copolymers, during coating cure.

As discussed below, the linkage groups 14 and the curing groups 18 may optionally be produced from the same types of monomers, and may form the same types of linkages between the copolymers. As such, the primary difference between the copolymer linkages 14a and the cured linkages 18a is typically the timing in which the linkage groups 14 and the curing groups 18 are grafted to the first-stage copolymers 10. The linkage groups 14 are preferably produced by grafting linkage monomers to the first-stage copolymers 10 after the first-stage polymerization, and prior to (or simultaneously with) the second-stage polymerization. The linkage groups 14 are then preferably polymerized with the second-stage copolymers 16 during the second-stage polymerization to produce the copolymer linkages 14a.

In comparison, the curing groups 18 are preferably produced by polymerizing curing monomers with other second-stage monomers during the second-stage polymerization, such that curing groups 18 are covalently attached to the second-stage copolymers 16. Curing groups 18 are then preferably grafted to the first-stage copolymers 10 during a subsequent curing step to form a coating, which typically occurs after the coating composition is formulated and applied to a substrate (e.g., sprayed onto a container surface). Accordingly, for ease of discussion, the monomers used to produce the linkage groups and corresponding copolymer linkages (e.g., linkage groups 14 and copolymer linkages 14a) are herein referred to as "linkage monomers", and the monomers used to produce the curing groups and corresponding cured linkages (e.g., curing groups 18 and cured linkages 18a) are herein referred to as "curing monomers".

It is also understood that, when linked with the copolymer linkages 14a and/or the cured linkages 18a, the first-stage copolymer(s) and the second-stage copolymer(s) are actually "copolymer chains" that collectively form a single copolymer molecule. However, for ease of discussion, the first-stage copolymers and the second-stage copolymers are herein referred to as separate "copolymers" with the understanding that at least some of them may be linked together at one or more locations (e.g., with the linkages 14a and/or 18a) to define a common copolymer molecule, and others may be completely separate copolymer molecules.

The latex emulsion produced from the above-discussed process may then be optionally further formulated and/or modified for different coating applications, thereby producing the coating composition of the present disclosure. The coating composition may then be applied to a metal substrate (or other suitable substrate), either before or after the substrate is formed into a food or beverage container (e.g., two-piece cans, three-piece cans) or a portion thereof (e.g., a food can or beverage can end, a closure for bottles or jars, etc.), whether it be a can end or can body. The applied coating composition may then be cured on the metal substrate to produce a coating. For example, as shown in FIG. 4, the curing step may further crosslink the first-stage copolymers 10 and the second-stage copolymers 16 with the use of the curing groups 18.

The use of the copolymer linkages (e.g., copolymer linkages 14a) preferably increases the crosslinking density of the resulting coating, rendering the coating particularly suitable for use in food and beverage contact situations, such as on the inside of such cans. In fact, in some embodiments, the coating composition may be cured with good crosslinking density without the use of a separate crosslinker, such as, e.g., a phenolic crosslinker. As such, in these embodiments, the coating composition can be substantially free of formaldehyde and formaldehyde-forming materials.

Typically, coating compositions derived from latex copolymers with high glass transition temperatures have reduced flexibility and/or sprayability, which can limit their uses in food and beverage packaging products. However, it has been found that, despite having copolymers with relatively high glass transition temperatures in some embodiments, the coating composition in such embodiments exhibits good sprayability properties and produces cured coatings having good flexibility.

While not wishing to be bound by theory, it is believed that this combination of corrosion resistance and good sprayability and flexibility is attained, at least in part, from the partially-crosslinked network of the copolymers that are interconnected with the copolymer linkages (e.g., copolymer linkages 14a). Additionally, it is believed that the copolymer linkages produce copolymers that are more densely packed and/or have reduced free volume, which can increase the moisture resistance of the resulting coating composition. As such, the coating composition of the present disclosure is particularly suitable for use as food and beverage-contact coatings in containers (or portions thereof).

The following is an example of a two-stage polymerization process (which may optionally include one or more additional stages) for producing the latex emulsion, for formulating a coating composition therefrom, and for forming cured coatings therefrom. In some embodiments, the polymerization process may function in an inverse core-shell reaction where the first-stage copolymers are formed first and are believed to form a "shell" portion (i.e., the first-stage copolymers are believed to associate more towards the outer portions of the latex) and the second-stage copolymers are formed subsequent thereto and form a "core" portion (i.e., the second-stage copolymers are believed to associate more towards the inner portions of the latex). The copolymer linkages (e.g., copolymer linkages 14a) between the first-stage copolymers and the second-stage copolymers may result in latex copolymers that deviate substantially from a typical core-shell arrangement.

Additionally, one or more polymer stages may optionally be formed either before the first-stage, after the second stage, and/or between the first and second stage. For example, prior to the first-stage polymerization, the multi-stage polymerization process may include one or more seed polymerization stages to form polymerized seeds from seed monomers. Examples of suitable seed monomers include those discussed below for the first-stage monomers. More preferably, less than about 10% by weight of the overall latex copolymer is formed by seed polymerization stage(s), even more preferably less than about 5% by weight, and even more preferably less than about 1% by weight. In some embodiments, substantially none of the overall latex copolymer is formed by seed polymerization stage(s).

During and/or prior to the first-stage polymerization, first-stage monomers may be dispersed or otherwise suspended in a carrier liquid or solution. In preferred embodiments, the first-stage polymerization may be an emulsion polymerization process that produces first-stage copolymers (e.g., first-stage copolymer 10) from the first-stage monomers dispersed in an aqueous carrier (e.g., aqueous carrier 12), optionally with the use of one or more surfactants. In alternative embodiments, the first-stage monomers may be solution polymerized in an organic solvent solution to produce the first-stage copolymers, where the resulting first-stage copolymers may then be dispersed into an aqueous carrier, optionally with the use of one or more surfactants. Preferred first-stage copolymers are capable of facilitating emulsification and/or polymerization of the second stage monomers.

The first-stage monomers preferably include a mixture of monomers capable of polymerizing under free radical-initiated emulsion polymerization conditions, such as monomers having ethylenically-unsaturated groups. Specific examples of suitable monomers having ethylenically-unsaturated groups include (meth)acrylate monomers, ethylenically-unsaturated monomers having at least one functional group capable of participating in a step-growth reaction (referred to herein as "step-growth-functional monomers"), ethylenically-unsaturated aromatic monomers, and mixtures thereof.

In certain preferred embodiments, the first-stage copolymer includes water-dispersing groups (e.g., salt or salt-forming groups) and more preferably a sufficient amount of water-dispersing groups so that the first-stage copolymer can function as a polymeric surfactant to facilitate the emulsion polymerization of the second-stage monomers.

Suitable (meth)acrylates for the first-stage monomers include those having the following structure:

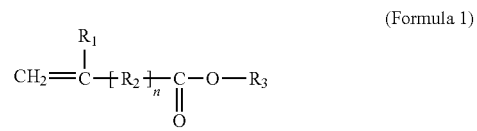

(Formula 1)

where group $R_1$ may be a hydrogen atom or an organic group, such as a $C_1$-$C_6$ alkyl group, and more preferably a hydrogen atom or a methyl group. Additionally, one or both of the hydrogen atoms attached to the terminal carbon atom of the ethylenically-unsaturated group may be replaced with an independant group $R_1$. Groups $R_2$ and $R_3$ may each independantly be any suitable organic group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_2$ is omitted and the ester (—$COOR_3$) group extends directly from the unsaturated group.

Specific examples of suitable (meth)acrylates encompass alkyl (meth)acrylates, which are preferably esters of acrylic or methacrylic acid. Examples of suitable alkyl (meth)acrylates include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-ethylhexyl (meth)acrylate, cyclohexyl (meth)acrylate, decyl (meth)acrylate, isodecyl (meth)acrylate, benzyl (meth)acrylate, lauryl (meth)acrylate, isobornyl (meth)acrylate, octyl (meth)acrylate, nonyl (meth)acrylate, hydroxyethyl acrylate (HEA), hydroxyethyl methacrylate (HEMA), hydroxypropyl (meth)acrylate (HPMA), and mixtures thereof. Difunctional (meth)acrylate monomers may be used in the monomer mixture as well. Examples include ethylene glycol di(meth)acrylate, 1,6-hexanediol di(meth)acrylate, allyl methacrylate, and the like.

The one or more (meth)acrylates may constitute greater than about 5%, more preferably greater than about 10%, and even more preferably greater than about 20% by weight of the first-stage monomers used to produce the first-stage copolymers. The (meth)acrylates may also constitute less than about 70%, more preferably less than about 50%, and even more preferably less than about 30% by weight of the first-stage monomers used to produce the first-stage copolymers.

Examples of suitable ethylenically-unsaturated step-growth-functional monomers include ethylenically-unsaturated acid-functional monomers, ethylenically-unsaturated alcohol-functional monomers, ethylenically-unsaturated amine-functional monomers, and ethylenically-unsaturated amide-functional monomers, and mixtures thereof. Preferably, the ethylenically-unsaturated step-growth-functional monomers are ethylenically-unsaturated acid-functional monomers, which may be included to provide acid functional groups to the resulting first-stage copolymers. As discussed below, the acid functional groups may assist in water dispersibility (e.g., via neutralization) and may also provide step-growth reaction sites for attaching the linkage groups 14.

Examples of suitable ethylenically-unsaturated acid-functional monomers include ethylenically-unsaturated carboxylic acid monomers, anhydrides thereof, salts thereof, and mixtures thereof. Illustrative ethylenically-unsaturated carboxylic acid monomers include those represented by the following structure:

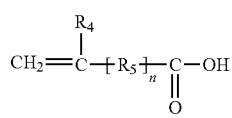

(Formula 2)

where the group $R_4$ may be a hydrogen atom or an organic group, such as a $C_1$-$C_6$ alkyl or ester group, and more preferably a hydrogen atom or a methyl group. Additionally, one or both of the hydrogen atoms attached to the terminal carbon atom of the ethylenically-unsaturated group may be replaced with an independent group $R_4$. Group $R_5$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_5$ is omitted and the carboxyl (—COOH) group extends directly from the unsaturated group.

Examples of suitable ethylenically-unsaturated carboxylic acid monomers include acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, and mixtures thereof. Preferred ethylenically-unsaturated carboxylic acid monomers include acrylic acid, methacrylic acid, crotonic acid, fumaric acid, maleic acid, 2-methyl maleic acid, itaconic acid, 2-methyl itaconic acid, and mixtures thereof. Furthermore, half esters of unsaturated anhydrides can be used as monofunctional unsaturated acids (e.g., butyl maleate, etc . . . )

Examples of suitable ethylenically-unsaturated anhydride monomers include compounds derived from the above-discussed ethylenically-unsaturated carboxylic acid monomers (e.g., as pure anhydride or mixtures of such). Preferred ethylenically-unsaturated anhydrides include acrylic anhydride, methacrylic anhydride, and maleic anhydride. If desired, aqueous salts of the above ethylenically-unsaturated carboxylic acid monomers may also be employed.

Examples of suitable ethylenically-unsaturated alcohol-functional monomers include monomers having ethylenically-unsaturated groups and one or more alcohol (—COH) groups. Illustrative alcohol-functional monomers include those represented by the following structure:

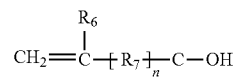

(Formula 3)

where the group $R_6$ may be a hydrogen atom or an organic group, such as a $C_1$-$C_6$ alkyl or ester group, and more preferably a hydrogen atom or a methyl group. Additionally, one or both of the hydrogen atoms attached to the terminal carbon atom of the ethylenically-unsaturated group may be replaced with an independant group $R_6$. Group $R_7$ may be any suitable divalent group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_7$ is omitted and the alcohol (—COH) group extends directly from the unsaturated group.

In some embodiments, the first-stage monomers may also include ethylenically-unsaturated amine-functional monomers and/or ethylenically-unsaturated amide-functional monomers, such as those having one or more vinyl groups and one or more amine and/or amide groups. Preferably, the amide functional groups undergo hydrolysis after the first-stage polymerization to produce amine-functional groups for the first-stage copolymers.

These monomers may provide amine-functional groups that can react with some embodied linkage monomers (e.g., cyclocarbonates) using a step-growth reaction to produce linkage groups 14, during the subsequent grafting step. The concentrations ranges of the ethylenically-unsaturated amine-functional monomers and ethylenically-unsaturated amide-functional monomers are preferably included in the above-discussed collective concentrations of the ethylenically-unsaturated acid-functional monomers and the ethylenically-unsaturated alcohol-functional monomers. However, in some embodiments, the coating composition of the present disclosure is substantially free or completely free of amide-functional materials (e.g., acrylamides).

The ethylenically-unsaturated step-growth-functional monomers may collectively constitute greater than about 5%, more preferably greater than about 10%, and even more preferably greater than about 20% by weight of the first-stage monomers used to produce the first-stage copolymers. The ethylenically-unsaturated step-growth-functional monomers may also collectively constitute less than about 50%, more preferably less than about 40%, even more preferably less than about 35%, and even more preferably less than about 30% by weight of the first-stage monomers used to produce the first-stage copolymers.

As mentioned above, at least some (and optionally all) of the ethylenically-unsaturated step-growth-functional monomers are preferably ethylenically-unsaturated acid-functional monomers. As such, preferred weight ranges for the ethylenically-unsaturated acid-functional monomers relative to the first-stage monomers used to produce the first-stage copolymers include those discussed above for the ethylenically-unsaturated step-growth-functional monomers. In some embodiments, the ethylenically-unsaturated step-growth-functional monomers include both acid-functional monomers and monomers having other functional groups (e.g., —OH, —NCO, —NH2, oxirane, etc . . . ).

Suitable ethylenically-unsaturated aromatic monomers include monomers having aromatic groups and ethylenically-unsaturated groups (e.g., aromatic vinyl monomers). Examples of suitable ethylenically-unsaturated aromatic monomers include styrene, methyl styrene, halostyrene, diallylphthalate, divinylbenzene, alpha-methylstyrene, vinyl toluene, vinyl naphthalene, and mixtures thereof. Styrene is a presently preferred vinyl monomer, in part due to its relatively low cost. However, in some embodiments, the first-stage monomers may be substantially free or completely free of styrene.

The ethylenically-unsaturated aromatic monomers may constitute greater than about 20%, more preferably greater than about 30%, even more preferably greater than about 40%, and even more preferably greater than about 45% by weight of the first-stage monomers used to produce the first-stage copolymers. The ethylenically-unsaturated aromatic monomers may also constitute less than about 70%, more preferably less than about 60%, and even more preferably less than about 55% by weight of the first-stage monomers used to produce the first-stage copolymers.

As can be appreciated, some of the above-described monomers may fall within multiple monomer categories. For example, some of the monomers may qualify as both a meth(acrylate) monomer and an ethylenically-unsaturated aromatic monomer, such as benzyl (meth)acrylate. Similarly, others of the monomers may qualify as both an ethylenically-unsaturated acid-functional monomer and an ethylenically-unsaturated aromatic monomer, such as cinnamic acid. In these situations, unless expressly stated otherwise, the above-discussed concentration ranges for the ethylenically-unsaturated aromatic monomers encompasses all aromatic monomers of the first-stage monomers, including those that also qualify as meth(acrylate) monomers, ethylenically-unsaturated acid-functional monomers, and/or ethylenically-unsaturated alcohol-functional monomers.

As mentioned above, in some preferred embodiments, the first-stage monomers may be emulsion polymerized in an aqueous carrier (e.g., aqueous carrier 12) to produce the first-stage copolymers (e.g., first-stage copolymer 10). In these embodiments, the first-stage monomers may also include one or more polymerizable surfactant monomers, which may assist in dispersing the first-stage monomers in the aqueous carrier, as well as polymerizing with each other and/or the above-discussed first-stage monomers to form chain segments of the first-stage copolymers and/or with subsequent stage monomers.

In these embodiments, the polymerizable surfactant monomers preferably include hydrophobic and hydrophilic portions, and are preferably capable of polymerizing under free radical-initiated polymerization conditions, such as surfactant monomers having ethylenically-unsaturated groups (e.g., (meth)acrylic-based polymerizable surfactant monomers). Examples of polymerizable surfactant monomers for use in the latex emulsion may include those having one or more hydrophobic portions, one or more hydrophilic portions, and one or more ethylenically-unsaturated group may be located at the hydrophobic portion, at the hydrophilic portion, or in-between.

The hydrophobic portion(s) may be any suitable substituted or unsubstituted hydrocarbon chain, such as a substituted or unsubstituted alkyl or alkenyl group, a substituted or unsubstituted cyclic hydrocarbon group, a substituted or unsubstituted aromatic hydrocarbon group, and combinations thereof. The hydrophobic portion preferably include one or more non-polar groups, such as one or more aromatic groups.

The hydrophilic portion(s) may be any suitable substituted or unsubstituted hydrocarbon chain, such as a substituted or unsubstituted alkyl or alkenyl chain, optionally with one or more ether linkages, which terminates in a polar group. The polar group may include one or more hydroxyl groups, acid groups (e.g., carboxylic acid groups), sulfonate groups, sulfinate groups, sulfate groups, phosphate groups, phosphinate groups, phosphonate groups, salt derivatives thereof, and combinations thereof.

Examples of suitable polymerizable surfactant monomers include those disclosed in U.S. Publication No. 2002/0155235; and those commercially available under the tradename "REASOAP" from Adeka Corporation, Tokyo, Japan., under the tradenames "NOIGEN" and "HITENOL" from Da-Ichi Kogyo Siyyaku Co., Ltd., Tokyo, Japan; and under the tradename "SIPOMER" from Solvay Rhodia, Brussels, Belgium. In embodiments that include polymerizable surfactant monomers, the polymerizable surfactant monomers may constitute greater than about 0.1%, more preferably greater than about 0.5%, and even more preferably greater than about 1% by weight of the first-stage monomers used to produce the first-stage copolymers. The polymerizable surfactant monomers may also constitute less than about 15%, more preferably less than about 10%, and even more preferably less than about 5% by weight of the first-stage monomers used to produce the first-stage copolymers.

More preferably, the first-stage monomers include a combination of one or more: (meth)acrylate monomers, one or more ethylenically-unsaturated acid-functional monomers, and one or more ethylenically-unsaturated aromatic monomers. In some embodiments, these more preferred first-stage monomers may also optionally include one or more polymerizable surfactant monomers.

A first particularly suitable combination of first-stage monomers includes one or more non-aromatic (meth)acrylates, one or more (meth)acrylic acids, one or more vinyl aromatic monomers, and optionally, one or more ethylenically-unsaturated polymerizable surfactant monomers. In this first particularly suitable combination, the non-aromatic (meth)acrylates may constitute from about 5% to about 40% by weight, and more preferably from about 15% to about 30% by weight; the (meth)acrylic acids may constitute from about 15% to about 40% by weight, and more preferably from about 20% to about 30% by weight; the vinyl aromatic monomers may constitute from about 35% to about 65% by weight, and more preferably from about 45% to about 55% by weight; and the optional ethylenically-unsaturated polymerizable surfactant monomer may constitute from 0% to about 10% by weight, and more preferably from about 1% to about 5% by weight; based on the entire weight of the first-stage monomers used to produce the first-stage copolymers.

A second particularly suitable combination of first-stage monomers includes one or more non-aromatic (meth)acrylates, one or more (meth)acrylic acids, one or more aromatic (meth)acrylates, and optionally, one or more ethylenically-unsaturated polymerizable surfactant monomers, and is substantially free of styrene. This embodiment illustrates an example coating composition that is substantially free of styrene, where the aromatic functionality is obtained with one or more aromatic (meth)acrylates (e.g., benzyl methacrylate).

In this second particularly suitable combination, the non-aromatic (meth)acrylates may constitute from about 5% to about 30% by weight, and more preferably from about 15% to about 25% by weight; the (meth)acrylic acids may constitute from about 10% to about 40% by weight, and more preferably from about 15% to about 30% by weight; the aromatic (meth)acrylates may constitute from about 40% to about 70% by weight, and more preferably from about 50% to about 65% by weight; and the optional ethylenically-unsaturated, polymerizable surfactant monomers may constitute from 0% to about 10% by weight, and more preferably from about 1% to about 5% by weight; based on the entire weight of the first-stage monomers used to produce the first-stage copolymers.

The aqueous carrier may include water, and optionally, one or more organic solvents. Examples of suitable organic solvents for use in the aqueous carrier may include methanol, ethanol, isopropyl alcohol, butyl alcohols (e.g., n-butanol and buytl glycol), 2-butoxyethanol, 2-(2-butoxyethoxy) ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Optionally, one or more non-polymerizable surfactants may also be used (e.g., alone or in combination with one or more polymerizable surfactants), such as surfactants that can support emulsion polymerization reactions. For example, the non-polymerizable surfactant(s) may include surfactants containing sulfonate groups, sulfate groups, phosphate groups, phosphinate groups, phosphonate groups, and combinations thereof; as well as ethoxylated surfactants. An example of a non-polymerizable surfactant includes dodecylbenzene sulfonic acid and sulfonates thereof (e.g., dodecylbenzene sulfonate salts, and particularly amine-neutralized salts).

The concentration of non-polymerizable surfactants may vary depending on the types and concentrations of the monomers used during the first-stage polymerization, including whether any polymerizable surfactant monomers are included. In embodiments that include non-polymerizable surfactants, the non-polymerizable surfactants may constitute greater than about 0.01%, more preferably greater than about 0.05%, and even more preferably greater than about 0.1% by weight, relative to a total weight of the first-stage monomers. The non-polymerizable surfactants may also constitute less than about 10%, more preferably less than about 7%, and even more preferably less than about 5% by weight, relative to the total weight of the first-stage monomers. The optional non-polymerizable surfactants used herein preferably have molecular weights less than about 2,000, and more preferably less than about 1,000.

In alternative embodiments, the first-stage polymerization may be performed as an emulsion polymerization process without the use of any polymerizable or non-polymerizable surfactants. Some extra stabilization of the latex is thought to be due to the incorporation in the polymer of ionic species coming from the initiators. Examples of such initiators include persulfate-based compounds, such as ammonium persulfate.

For an emulsion polymerization process conducted during the first-stage polymerization, the one or more surfactants (or alternative dispersant compounds) may be initially dispersed in the aqueous carrier, which is preferably accompanied by agitation of the aqueous carrier. Additionally, the resulting surfactant dispersion is preferably heated to assist in the subsequent polymerization reactions. Preferred temperatures for heating the surfactant dispersion include temperatures greater than about 65° C., and more preferably from about 70° C. to about 90° C. The pH of the dispersion may be maintained at any suitable level, such as from about 5 to about 12. The first-stage monomers and the one or more surfactants may be added to the reaction mixture at any suitable time relative to one another—e.g., simultaneous addition, the addition of surfactant prior to the addition of first-stage monomer, and/or the addition of surfactant after the addition of first-stage monomer When the aqueous dispersion reaches the desired temperature, the first-stage monomers may be introduced to the dispersion. The first-stage monomers may be added incrementally or continuously to the aqueous dispersion over time. Alternatively, in certain embodiments a batch or semi-batch process may be used to polymerize the first-stage monomers in the aqueous dispersion.

One or more polymerization initiators may also be added to the aqueous dispersion (e.g., along with the first-stage monomers) to initiate the first-stage polymerization. Suitable polymerization initiators include free-radical initiators, such as one or more peroxides and/or persulfates and similar compounds. Examples of suitable peroxides include hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates; and mixtures thereof. Azoic compounds can also be used to generate free radicals such as 2,2'-azo-bis(isobutyronitrile), 2,2'-azo-bis(2,4-dimethylvaleronitrile), and 1-t-butyl-azocyanocyclohexane; and mixtures thereof. Examples of suitable persulfates include persulfates of ammonium or alkali metal (potassium, sodium or lithium). Perphosphates can be also a source of free radicals, and mixtures thereof.

Polymerization initiators can be used alone or as the oxidizing component of a redox system, which also typically includes a reducing component such as ascorbic acid (e.g., isoascorbic acid), erythorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, ferrous complexes (e.g., ferrous sulphate heptahydrate), and mixtures thereof. The reducing component is frequently referred to as an accelerator or a catalyst activator.

The initiator and accelerator (if used) are preferably each used in concentrations greater than about 0.001%, more preferably greater than about 0.1%, and even more preferably greater than about 1% by weight, relative to the total weight of the first-stage monomers. The initiator and accelerator (if used) are also preferably each used in concentrations less than about 10%, more preferably less than about 7%, and even more preferably less than about 5% by weight, relative to the total weight of the first-stage monomers.

Promoters such as chloride and sulfate salts of cobalt, iron, nickel or copper can be used in small amounts, if desired. Examples of redox catalyst systems include tert-butyl hydroperoxide/sodium formaldehyde sulfoxylate/Fe (II), and ammonium persulfate/sodium bisulfite/sodium hydrosulfite/Fe(II).

The first stage polymerization may continue for a suitable duration to polymerize the first-stage monomers with a free-radical initiated polymerization process. This produces the first-stage copolymers (e.g., first-stage copolymer 10), which may be linear, branched, or combinations thereof.

In preferred embodiments, due to the inclusion of the ethylenically-unsaturated step-growth-functional monomers, at least some, and more preferably substantially each of the first-stage copolymers have one or more step-growth-functional groups, such as one or more acid-functional groups (e.g., pendant carboxylic acid groups and/or anhydride groups), one or more alcohol-functional groups, and/or one or more amine-functional groups. As discussed below, in some embodiments, at least a portion of these step-growth-functional groups may subsequently react with the linking monomers or the curing monomers to link the first-stage copolymers to the second-stage copolymers and/or function as water dispersing groups (e.g., when neutralized).

In embodiments in which the first-stage copolymer includes acid-functional step-growth-functional monomers, after the first-stage polymerization is completed, at least a portion of the carboxylic acid groups and/or anhydride groups of the first-stage copolymers may be neutralized or partially neutralized with a suitable basic compound to produce water-dispersing groups. Alternatively (or additionally), in some embodiments, one or more the first-stage monomers may be pre-neutralized prior to the first-stage polymerization.

The basic compound used for neutralization is preferably a fugitive base, more preferably an amine fugitive base (e.g., primary, secondary, and/or tertiary amines), with tertiary amines being particularly preferred. Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, N dimethyl 1-hydroxy-2-propyl amine, triethyl amine, tributyl amine, N-methyl morpholine, and mixtures thereof. Triethyl amine and dimethyl ethanol amine are preferred tertiary amines.

The degree of neutralization required may vary considerably depending upon a variety of factors such as the amount of acid or base groups included in the first-stage copolymers, and the degree of dispersibility that is desired. In embodiments in which neutralized acid groups are used for water dispersibility, preferred acid numbers for the first-stage copolymer prior to neutralization include acid numbers greater than about 40, more preferably greater than about 80, and even more preferably greater than about 100 milligrams (mg) potassium hydroxide (KOH) per gram of the first-stage copolymer. Preferred acid numbers for the first-stage copolymer prior to neutralization also include acid numbers less than about 400, more preferably less than about 350, and even more preferably less than about 300 mg KOH per gram of the first-stage copolymer. Acid numbers referred to herein are calculated pursuant to BS EN ISO 3682-1998 standard, or alternatively may be theoretically determined based on the reactant monomers.

Typically, to render the first-stage copolymers water-dispersible, at least 25% of the acid groups of the first-stage copolymers are neutralized, preferably at least 30% are neutralized, and more preferably at least 35% are neutralized. Preferably, the first-stage copolymers include a sufficient number of water-dispersing groups to form a stable dispersion in the aqueous carrier. Furthermore, in embodiments incorporating polymerizable surfactant monomer and/or other surfactant, the hydrophilic portions of the surfactant may also assist in dispersing the first-stage copolymers in the aqueous carrier.

While the first-stage copolymers have been primarily described herein with acid-based water-dispersing groups that are neutralized with basic compounds, in alternative embodiments, the water-dispersing groups may be basic groups that are neutralized with acidic compounds. Examples of suitable basic groups for this embodiment include those disclosed in O'Brien et al., U.S. Pat. No. 8,092,876. Examples of suitable acidic neutralizing compounds include formic acid, acetic acid, hydrochloric acid, sulfuric acid, and mixtures thereof.

Preferred number-average molecular weights for the first-stage copolymer in this emulsion-polymerized embodiment include those greater than about 50,000, more preferably greater than about 100,000, even more preferably greater than about 500,000, and even more preferably greater than about 1,000,000.

Preferred glass transition temperatures for the first-stage copolymer in this emulsion-polymerized embodiment include those greater than about 15° C., more preferably greater than about 20° C., even more preferably greater than about 25° C., and most preferably greater than about 30° C. Preferred glass transition temperatures for the first-stage copolymer in this emulsion-polymerized embodiment include those less than about 150° C., more preferably less than about 140° C., and even more preferably less than about 130° C. The glass transition temperatures referred to herein are theoretically calculated pursuant to the Flory-Fox Equation.

Nonetheless, as mentioned above, in alternative embodiments, the first-stage monomers may be solution polymerized in an organic solvent solution to produce the first-stage copolymers, where the resulting first-stage copolymers may then be at least partially neutralized and transferred to an aqueous carrier (e.g., aqueous carrier 12), optionally with the use of one or more surfactants. Examples of suitable organic solvent solutions for use in these embodiments include those discussed above. Additionally, examples of suitable first-stage copolymers produced with solvent-borne polymerization processes include those disclosed in O'Brien et al., U.S. Pat. No. 8,092,876. For example, the first-stage copolymers can be polymers other than (or in addition to) acrylate-based polymers, such as polyesters, polyurethanes, alkyds, copolymers thereof, and mixtures thereof.

In this solvent-borne polymerization process, the number-average molecular weights of the resulting first-stage copolymer is typically less than about 20,000, and more typically from about 2,000 to about 10,000. Additionally, typical glass transition temperatures of the resulting first-stage copolymer in this solvent-borne polymerization process typically range from about 10° C. to about 80° C., and more typically from about 30° C. to about 70° C.

After the first-stage polymerization is completed, one or more linkage monomers may then be added to the aqueous carrier to graft to the first-stage copolymer, such as with a step-growth reaction. The step-growth reaction may be performed at any suitable temperature, such as at the same temperature(s) as discussed above for the first stage polymerization. This preferably produces pendant linkage groups (e.g., linkage groups 14, as shown in FIG. 2) that extend from the first-stage copolymers (e.g., first-stage copolymer 10), and include functionalities capable of reacting with second-stage monomers to form covalent linkages.

The linkage group grafting step is preferably performed after the first-stage polymerization is completed to prevent the first-stage monomers from reacting with the ethylenically-unsaturated groups of the linkage monomers. As such, if desired, an inhibitor, such as phenothiazine, may be added after the first-stage polymerization is completed to prevent the polymerization reaction from affecting the linkage monomers at this point in the process, and unsuitably consuming carbon-carbon double bonds of the linkage monomers.

The linkage monomer preferably includes at least two different functional groups. The first functional group of the linkage monomer preferably compliments the step-growth-functional groups of the first-stage copolymers (e.g., the acid-, alcohol-, and amine-functional groups, and the like), thereby allowing the first functional group to react with one of the step-growth-functional groups via a step-growth reaction. Examples of preferred groups for the first functional group of the linkage monomer include oxirane groups, isocyanate groups, azlactone groups, oxazoline groups, cyclocarbonate groups, and the like; and also hydroxyl groups, acid groups, amine groups, and the like if not otherwise introduced in the first-stage polymerization.

In comparison, the second functional group of the linkage monomer is preferably configured to react with additional monomers that are subsequently added in the second-polymerization stage (or even a subsequent optional polymerization). Accordingly, examples of preferred groups for the second functional group include ethylenically-unsaturated groups, such as vinyl groups.

Suitable linkage monomers include those having the following structure:

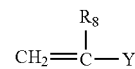

(Formula 4)

where group $R_8$ may be a hydrogen atom or an organic group, such as a $C_1$-$C_6$ alkyl group, and more preferably a hydrogen atom or a methyl group, or any other suitable group preferably having an atomic weight less than about 85. Additionally, one or both of the hydrogen atoms attached to the terminal carbon atom of the ethylenically-unsaturated group may be replaced with an independent group $R_8$.

Group "Y" preferably includes the first functional group of the linkage monomer, which is configured to react with one of the step-growth-functional groups of the first-stage copolymers, such as an oxirane-containing group, an isocyanate group, an azlactone group, an oxazoline group, a cyclocarbonate group, and the like. In some preferred embodiments, "Y" has the following structure:

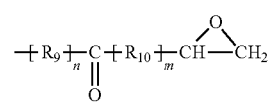

(Formula 5)

Groups $R_9$ and $R_{10}$ may each independently be any suitable organic group, such as, for example, a $C_1$-$C_{16}$ alkyl or alkenyl group, which can be substituted with one or more (e.g., 1-3) groups such as hydroxy group, halogen groups, phenyl groups, oxirane groups, and alkoxy groups, for example. The integer "n" may be zero or one, more preferably zero such that group $R_9$ is omitted and the carbonyl —C(O)— group extends directly from the unsaturated group. The integer "m" may be zero or one, more preferably one such that group $R_{10}$, which is preferably an alkoxy group, extends between the carbonyl —C(O)— group and the oxirane group.

In some preferred embodiments, the first functional group "Y" includes an oxirane group, such as in an oxirane-containing ethylenically-unsaturated monomers (e.g., as shown above in Formula 5). Examples of suitable linkage monomers containing oxirane groups include glycidyl esters of alpha, beta-unsaturated acids, or anhydride thereof (e.g., an oxirane group-containing alpha, beta-ethylenically unsaturated monomer). Suitable alpha, beta-unsaturated acids include monocarboxylic acids or dicarboxylic acids. Examples of such carboxylic acids include acrylic acid, methacrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, maleic acid, fumaric acid, tricarboxyethylene, maleic anhydride, and mixtures thereof.

Specific examples of suitable linkage monomers containing a glycidyl group are glycidyl (meth)acrylate (e.g., glycidyl methacrylate and glycidyl acrylate), mono- and di-glycidyl itaconate, mono- and di-glycidyl maleate, and mono- and di-glycidyl formate. A preferred linkage monomer is glycidyl methacrylate ("GMA").

In other embodiments, the first functional group "Y" may be an isocyanate group. In these embodiments, examples of suitable linkage monomers include ethylenically-unsaturated isocyanate monomers, such as vinyl isocyanates (e.g., isopropenyl dimethylbenzyl isocyanate from Cytec Industries, Inc., Woodland Park, N.J.). The isocyanate groups preferably compliment first-stage copolymers having acid-functional groups and/or alcohol-functional groups, more preferably alcohol-functional groups, which can undergo step-growth reactions with the isocyanate groups.

In further embodiments, the first functional group "Y" may be an azlactone or an oxazoline group. In these embodiments, examples of suitable linkage monomers include ethylenically-unsaturated azlactone monomers (e.g., vinyl azlactones, such as those available from Isochem SAS, 3 Rue Lavoisier, 91710-Vert le Petit,) and ethylenically-unsaturated oxazoline monomers (e.g., vinyl oxazolines, such as those available from Sigma Aldrich). The azlactone and oxazoline groups preferably compliment first-stage copolymers having acid-functional groups, which can undergo step-growth reactions with the azlactone groups or the oxazoline groups.

In other embodiments, the first functional group "Y" may be a cyclocarbonate group. In these embodiments, examples of suitable linkage monomers include ethylenically-unsaturated cyclocarbonate monomers, such as vinyl cyclocarbonates (e.g., vinylidene carbonate, and cyclocarbonates obtained by carbonization of glycidyl methacrylate). The cyclocarbonate groups preferably compliment first-stage copolymers having amine-functional groups, which can undergo step-growth reactions with the cyclocarbonate groups.

For example, a given linkage monomer may include a first functional group "Y" and an ethylenically-unsaturated group (i.e., the second functional group). The first functional group "Y" may react with one of the step-growth-functional groups of the first-stage copolymer, such as with a step-growth reaction, to produce a linkage group 14 characterized as a pendant ethylenically-unsaturated group. For instance, when the first functional group "Y" is an oxirane group and the step-growth-functional groups of the first-stage copolymer are pendant carboxylic acid groups, the oxirane group may react with one of the pendant carboxylic acid groups via a condensation step-growth reaction to produce a linkage group 14 characterized as a grafted ester segment terminated with the ethylenically-unsaturated group.

The linkage monomers are preferably used in an amount greater than about 0.5%, more preferably greater than about 2%, and even more preferably greater than about 3% by weight, relative to a total weight of the first-stage monomers and the linkage monomers. The linkage monomers are also preferably used in an amount less than about 15%, more preferably less than about 10%, and even more preferably less than about 5% by weight, relative to the total weight of the first-stage monomers and the linkage monomers.

In embodiments in which the step-growth-functional groups of the first-stage copolymers are acid-functional groups (e.g., carboxylic acid groups and/or anhydrides thereof), the grafting of the linkage monomers to produce linkage groups 14 consumes at least a portion of the available acid-functional groups, thereby reducing the acid number of the resulting first-stage copolymers. Thus, if the acid-functional groups of the first-stage copolymers are also intended to function as the water-dispersing groups (e.g., after neutralization), then an excess of acid groups should be included. In these embodiments, preferred acid numbers for the first-stage copolymer after the linkage group grafting include acid numbers greater than about 50, more preferably greater than about 60, and even more preferably greater than about 70 milligrams (mg) KOH per gram of the first-stage copolymer. In these embodiments, preferred acid numbers for the first-stage copolymer after the linkage group grafting also include acid numbers less than about 250, more preferably less than about 240, and even more preferably less than about 230 mg KOH per gram of the first-stage copolymer.

After the linkage group grafting step is completed, the second stage polymerization may be conducted to produce the second-stage copolymers (e.g., second-stage copolymers 16, shown in FIG. 3). Alternatively, in some embodiments, the second-stage polymerization may be conducted in a manner that is at least partially simultaneous with the linkage group grafting step.

In either case, the second-stage polymerization may initially involve adding second-stage monomers and a suitable polymerization initiator to the aqueous dispersion containing the first-stage copolymers (which are preferably at least partially neutralized and include the linkage groups 14), where examples of suitable polymerization initiators and their concentrations for the second-stage polymerization include those discussed above for the first-stage polymerization.

The second-stage monomers may include the same types of ethylenically-unsaturated monomers as used for the first-stage monomers, such as one or more (meth)acrylate monomers, optionally one or more of ethylenically-unsaturated step-growth-functional monomers, and optionally one or more ethylenically-unsaturated aromatic monomers. Such ethylenically-unsaturated monomers for the second-stage monomers include those discussed above for the first-stage monomers. In preferred embodiments, the second stage monomers are, when considered overall, more hydrophobic relative to those of the first-stage copolymer.

Furthermore, in some preferred embodiments, the second-stage monomers are chemically different from the first-stage monomers, such that the second-stage copolymer is chemically different from the first-stage copolymer. For example, at least about 5%, more preferably at least about 10% by weight of the first-stage monomers are different than the second-stage monomers. In some embodiments, the monomers used to form both the first-stage and second-stage monomers may be the same but used in different proportions relative to one another.

The (meth)acrylate monomers may constitute greater than about 5%, more preferably greater than about 10%, and even more preferably greater than about 15% by weight of the second-stage monomers used to produce the second-stage copolymers. (Meth)acrylate monomers may also constitute less than about 55%, more preferably less than about 40%, and even more preferably less than about 35% by weight of the second-stage monomers used to produce the second-stage copolymers.

In some embodiments, the second-stage monomers are substantially free of one or more step-growth-functional monomers that were present in the first-stage monomers (e.g., substantially free of ethylenically-unsaturated acid-functional monomers). The second-stage monomers preferably include one or more curing monomers, which may undergo step-growth reactions in the same manner as the above-discussed linkage monomers, but during a subsequent curing step to form a cured coating. The curing monomers are preferably step-growth functional ethylenically unsaturated monomer having a step-growth functional group that is reactive with a step-growth functional group present in the first-stage copolymer. Accordingly, examples of suitable curing monomers for use in the second-stage monomers include those discussed above for linkage monomers, with a preferred curing monomer being glycidyl methacrylate.

The curing monomers, if present, may constitute, for example, greater than about 5%, more preferably greater than about 10%, and even more preferably greater than about 15% by weight of the second-stage monomers used to produce the second-stage copolymers. The curing monomers may also constitute less than about 40%, more preferably less than about 30%, and even more preferably less than about 25% by weight of the second-stage monomers used to produce the second-stage copolymers.

The ethylenically-unsaturated aromatic monomers, if present, may constitute, for example, greater than about 20%, more preferably greater than about 35%, and even more preferably greater than about 50% by weight of the second-stage monomers used to produce the second-stage copolymers. The ethylenically-unsaturated aromatic monomers may also constitute less than about 80%, more preferably less than about 75%, and even more preferably less than about 65% by weight of the second-stage monomers used to produce the second-stage copolymers.

Some of the above-described second-stage monomers may also fall within multiple monomer categories. For example, some of the monomers may qualify as both a meth(acrylate) monomer and an ethylenically-unsaturated aromatic monomer, such as benzyl (meth)acrylate. In these situations, unless expressly stated otherwise, the above-discussed concentration ranges for the ethylenically-unsaturated aromatic monomers encompasses all aromatic monomers of the second-stage monomers, including those that also qualify as meth(acrylate) monomers, ethylenically-unsaturated acid-functional monomers, ethylenically-unsaturated alcohol-functional monomers, ethylenically-unsaturated amine/amide-functional monomers and/or the curing monomers.

More preferably, the second-stage monomers include a combination of one or more non-aromatic (meth)acrylate monomers, one or more ethylenically-unsaturated aromatic monomers, and one or more curing monomers.

A first particularly suitable combination of second-stage monomers includes one or more non-aromatic (methyl)acrylates, one or more vinyl aromatic monomers, and one or more oxirane-containing (meth)acrylates. In this first particularly suitable combination, the non-aromatic (methyl)acrylates may constitute from about 5% to about 40% by weight, and more preferably from about 10% to about 30% by weight; the vinyl aromatic monomers may constitute from about 35% to about 75% by weight, and more preferably from about 50% to about 65% by weight; and the oxirane-containing (meth)acrylates may constitute from about 5% to about 30% by weight, and more preferably from about 10% to about 25% by weight; based on the entire weight of the second-stage monomers used to produce the second-stage copolymers.

A second particularly suitable combination of second-stage monomers includes one or more non-aromatic (methyl)acrylates, one or more aromatic (meth)acrylates, and one or more oxirane-containing (meth)acrylates, wherein the second-stage monomers are substantially free of styrene. This embodiment illustrates an example coating composition that is substantially free of styrene, where aromatic functionality is obtained with an aromatic (meth)acrylate (e.g., benzyl methacrylate). In this second particularly suitable combination, the non-aromatic (methyl)acrylates may constitute from about 10% to about 55% by weight, and more preferably from about 20% to about 40% by weight; the aromatic (meth)acrylates may constitute from about 30% to about 60% by weight, and more preferably from about 40% to about 50% by weight; and the oxirane-containing (meth)acrylates may constitute from about 5% to about 30% by weight, and more preferably from about 10% to about 25% by weight; based on the entire weight of the second-stage monomers used to produce the second-stage copolymers.

The second-stage polymerization may continue for a suitable duration to polymerize the second-stage monomers with a free-radical initiated polymerization process. The resulting second-stage copolymers (e.g., second-stage copolymers 16), may be linear, branched, or combinations thereof. For example, the curing monomers preferably polymerize with other second-stage monomers to form pendant curing groups (e.g., curing groups 18 shown in FIG. 3) extending from the second-stage copolymers. As discussed below, these curing groups may react with step-growth-functional groups present on the first-stage copolymers during a subsequent curing step.

Because the second-stage monomers are emulsion polymerized in the presence of the first-stage copolymers, the linkage groups 14 grafted to the first-stage copolymers (e.g., pendant ethylenically-unsaturated groups) may function as polymerization sites for growing second-stage copolymers from the first-stage monomers and/or for attaching separately-formed second-stage copolymers to the first-stage copolymers. This is believed to result in copolymer linkages (e.g., copolymer linkages 14a) interconnecting the first-stage copolymers and the second-stage copolymers. It is understood that some of the second-stage monomers may also polymerize to form second-stage copolymers that are completely separate copolymer molecules from the first-stage copolymers.

For example, the copolymer linkages (e.g., copolymer linkages 14a) may have the following structure:

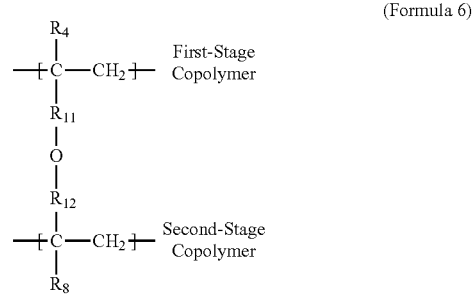

(Formula 6)

where groups $R_4$ and $R_8$ refer to the same groups discussed above in Formulas 2 and 4, and are preferably hydrogen atoms or methyl groups. Group $R_{11}$ may be based on the monomer used to form the step-growth-functional group on the first-stage copolymer, such as the shown above in Formula 2. For example, group $R_{11}$ may be a carbonyl —C(O)— group. Similarly, Group $R_{12}$ may be based on the linkage monomer that is grafted to the step-growth-functional group on the first-stage copolymer, such as shown above in Formulas 4 and 5. For example, group $R_{12}$ may have the following structures:

(Formula 7)

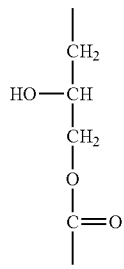

(Formula 8)

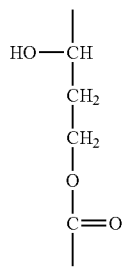

where the hydrogen atoms of the $CH_2$ and CH groups may each optionally be independently substituted with a short alkyl group (e.g., a $C_1$-$C_3$ alkyl group).

Accordingly, in a preferred embodiment, the copolymer linkage (e.g., copolymer linkage 14a) includes structures as shown in Formulas 6-8, where the group $R_{11}$ is a carbonyl group. This may be produced with the use of methacrylic acid for the step-growth-functional monomer, and glycidyl methacrylate for the linkage monomer, where the oxirane group of the glycidyl methacrylate undergoes a condensation reaction with the carboxylic acid group of the methacrylic acid. This produces the copolymer linkage having a —C(OH)— group disposed between opposing ester linkages, where the carbonyl groups of the ester linkages are directly connected to carbon atoms of the backbones of the first and second-stage copolymers, as illustrated, for example, by the following structures:

(Formula 9)

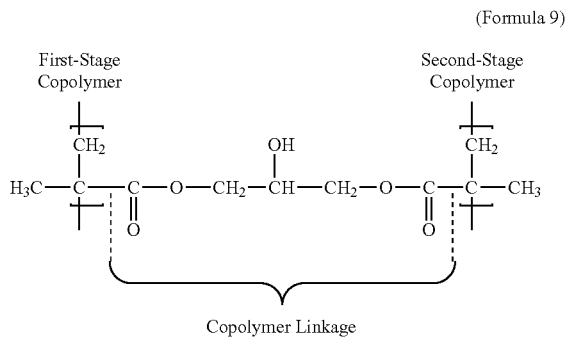

(Formula 10)

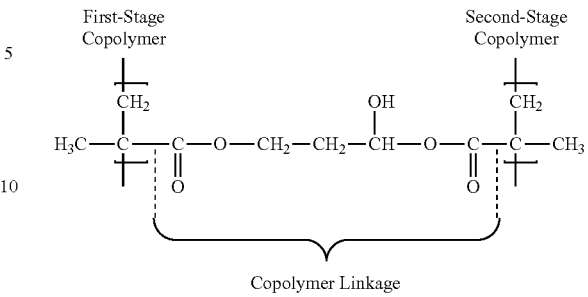

where the hydrogen atoms of the $CH_2$ and CH groups in the copolymer linkage may each optionally be independently substituted with a short alkyl group (e.g., a $C_1$-$C_3$ alkyl group), as mentioned above.

While not intending to be bound by theory, the copolymer linkages are believed to produce an interconnected network of the first-stage copolymers and the second-stage copolymers. This, in combination with monomer selection, can provide high glass transition temperatures for the resulting copolymer latex.

Preferred glass transition temperatures for the second-stage copolymer include those discussed above for the first-stage copolymer. Preferred glass transition temperatures for the overall resulting copolymers of the latex emulsion (i.e., the emulsion polymerized latex) include those greater than about 15° C., more preferably greater than about 20° C., even more preferably greater than about 25° C., and most preferably greater than about 30° C. Preferred glass transition temperatures for the resulting copolymers of the latex emulsion also include those less than about 150° C., more preferably less than about 140° C., and even more preferably less than about 130° C.

Preferred acid numbers for the resulting copolymer latex (e.g., after the second-stage polymerization) include acid numbers greater than about 10, more preferably greater than about 20, and even more preferably greater than about 30 milligrams mg KOH per gram of the copolymer latex. In these embodiments, preferred acid numbers for the resulting copolymer latex (e.g., after the second-stage polymerization) also include acid numbers less than about 150, more preferably less than about 140, and even more preferably less than about 130 mg KOH per gram of the copolymer latex.

Moreover, preferred amounts of the first-stage monomers, relative to the total weight of the first-stage monomers, the second-stage monomers, and the linkage monomers, include amounts greater than 20%, more preferably greater than 30%, and even more preferably greater than 45% by weight. In some embodiments, preferred amounts of the first-stage monomers, relative to the total weight of the first-stage monomers, the second-stage monomers, and the linkage monomers, also include amounts less than 80%, more preferably less than 70%, and even more preferably less than 60% by weight.

Preferred amounts of the second-stage monomers, relative to the total weight of the first-stage monomers, the second-stage monomers, and the linkage monomers, include amounts greater than 20%, more preferably greater than 30%, and even more preferably greater than 40% by weight. In some embodiments, preferred amounts of the second-stage monomers, relative to the first-stage monomers, the second-stage monomers, and the linkage monomers, also include amounts less than 80%, more preferably less than 70%, and even more preferably less than 55% by weight.

Preferred amounts of the linkage monomers, relative to the total weight of the first-stage monomers, the second-stage monomers, and the linkage monomers, include amounts greater than 0.1%, more preferably greater than 1%, and even more preferably greater than 1.5% by weight. In some embodiments, preferred amounts of the linkage monomers, relative to the first-stage monomers, the second-stage monomers, and the linkage monomers, also include amounts less than 10%, more preferably less than 7%, and even more preferably less than 4% by weight.

The latex emulsion produced with the above-discussed two-stage polymerization process may optionally include additional polymerization stages, if desired. Such additional polymerization stages may occur at any suitable time (e.g., after the second stage, between the first and second stages, etc . . . ). As mentioned above, the first and second polymerization stages are example stages for producing the overall resulting copolymers of the latex emulsion, and one or more seed polymerization stages and/or one or more additional post-polymerization stages may be used. Preferably, the first and second stage copolymers constitutes at least about 50% by solids weight of the resulting copolymers, more preferably at least about 75% by weight, even more preferably at least about 90% by weight, and even more preferably from about 95% to 100% by weight. In some embodiments, the resulting copolymers of the latex emulsion consist essentially of the first and second stage copolymers.

Furthermore, a coating composition may be formulated from the latex emulsion, optionally with the inclusion of one or more additives and/or by rheological modification for different coating applications (e.g., diluted for spray coating applications). In embodiments in which the coating composition includes one or more additives, the additives preferably do not adversely affect the latex emulsion, or a cured coating formed from the coating composition. For example, such optional additives may be included in the coating composition to enhance composition esthetics, to facilitate manufacturing, processing, handling, and application of the composition, and to further improve a particular functional property of the coating composition or a cured coating resulting therefrom.

Such optional additives include, for example, catalysts, dyes, pigments, toners, extenders, fillers, lubricants, anticorrosion agents, flow control agents, thixotropic agents, dispersing agents, antioxidants, adhesion promoters, light stabilizers, co-resins and mixtures thereof. Each optional additives is preferably included in a sufficient amount to serve its intended purpose, but not in such an amount to adversely affect the coating composition or a cured coating resulting therefrom.

One preferred optional additive is a catalyst to increase the rate of cure. Examples of catalysts, include, but are not limited to, strong acids (e.g., dodecylbenzene sulphonic acid (DDBSA, available as CYCAT 600 from Cytec), methane sulfonic acid (MSA), p-toluene sulfonic acid (pTSA), dinonylnaphthalene disulfonic acid (DNNDSA), and triflic acid), quaternary ammonium compounds, phosphorous compounds, and tin and zinc compounds. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art.

If used, the catalyst is preferably present in an amount of at least about 0.01% by weight, and more preferably at least about 0.1% by weight, based on the total solids weight of the coating composition. Furthermore, if used, the catalyst is also preferably present in an amount of no greater than about 3% by weight, and more preferably no greater than about 1% by weight, based on the total solids weight of the coating composition.

Another useful optional ingredient is a lubricant (e.g., a wax), which facilitates manufacture of metal closures and other fabricated coated articles by imparting lubricity to sheets of coated metal substrate. Preferred lubricants include, for example, Carnauba wax and polyethylene-type lubricants. If used, a lubricant is preferably present in the coating composition in an amount of at least about 0.1% by weight, and preferably no greater than about 2% by weight, and more preferably no greater than about 1% by weight, based on the total solids weight of the coating composition.

Another useful optional ingredient is a pigment, such as titanium dioxide. If used, a pigment is present in the coating composition in an amount of no greater than about 70% by weight, more preferably no greater than about 50% by weight, and even more preferably no greater than about 40% by weight, based on the total solids weight of the coating composition.

The above-discussed resulting copolymers of the multi-stage polymerization process may also be blended with one or more additional latex copolymers, as desired. In some embodiments, the above-discussed resulting copolymers are greater than about 50% by weight of the blended latex emulsion, more preferably greater than about 75%, even more preferably greater than about 90%, and even more preferably from about 95% to 100%, based on an entire weight of latex copolymers in the coating composition. In some embodiments, the latex copolymers of the coating composition consist essentially of the above-discussed resulting copolymers.

The latex emulsion may also incorporate one or more optional curing agents (e.g., crosslinking resins, sometimes referred to as "crosslinkers"). The choice of particular crosslinker typically depends on the particular product being formulated. For example, some coatings are highly colored (e.g., gold-colored coatings). These coatings may typically be formulated using crosslinkers that themselves tend to have a yellowish color. In contrast, white coatings are generally formulated using non-yellowing crosslinkers, or only a small amount of a yellowing crosslinker. Preferred curing agents are substantially free of BPA, BPF, BPS, glycidyl ether compounds thereof (e.g., BADGE), and epoxy novolacs.

Any of the well known hydroxyl-reactive curing resins can be used. For example, phenoplast, blocked isocyanates, and aminoplast curing agents may be used, as well as combinations thereof. Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

As examples of other generally suitable curing agents are the blocked or non-blocked aliphatic, cycloaliphatic or aromatic di-, tri-, or poly-valent isocyanates, such as hexamethylene diisocyanate (HMDI), cyclohexyl-1,4-diisocyanate, and the like. Further examples of generally suitable blocked isocyanates include isomers of isophorone diisocyanate, dicyclohexylmethane diisocyanate, toluene diisocyanate, diphenylmethane diisocyanate, phenylene diisocyanate, tetramethyl xylene diisocyanate, xylylene diisocyanate, and mixtures thereof. In some embodiments, blocked isocyanates are used that have a number-average molecular weight of at least about 300, more preferably at least about 650, and even more preferably at least about 1,000.

The concentration of the curing agent (e.g., crosslinker) in the coating composition may depend on the type of curing agent, the time and temperature of the bake, and the molecular weight of the latex copolymer. If used, the crosslinker is typically present in an amount of up to about 50% by weight, preferably up to about 30% by weight, and more preferably up to about 15% by weight. If used, the crosslinker is typically present in an amount of at least about 0.1% by weight, more preferably at least about 1% by weight, and even more preferably at least about 1.5% by weight. These weight percentages are based on the total solids weight of the coating composition.

As discussed above, the copolymer linkages 14a are believed to increase the crosslinking density of the resulting coating without unsuitably degrading coating flexibility, rendering the coating particularly suitable for use in food and beverage-contact situations, such as on the inside or exterior of food or beverage containers. Accordingly, in some embodiments, the coating composition may be cured to achieve good crosslinking density without the use of an external crosslinker (e.g., phenolic crosslinkers). Additionally, the coating composition may be substantially free of formaldehyde and formaldehyde-conditioning materials, more preferably essentially free of these compounds, even more preferably essentially completely free of these compounds, and most preferably completely free of these compounds.

Preferred glass transition temperatures for the cured coating include those greater than about 20° C., more preferably greater than about 25° C., even more preferably greater than about 30° C., and most preferably greater than about 35° C. Preferred glass transition temperatures for the cured coating also include those less than about 155° C., more preferably less than about 145° C., and even more preferably less than about 135° C.

In preferred embodiments, the coating composition is substantially free or completely free of any structural units derived from bisphenol A ("BPA"), bisphenol F ("BPF"), bisphenol S ("BPS"), or any diepoxides thereof (e.g., diglycidyl ethers thereof such as the diglycidyl ether of BPA ("BADGE")). In addition, the coating composition is preferably substantially free or completely free of any structural units derived from a dihydric phenol, or other polyhydric phenol, having estrogenic agonist activity great than or equal to that of 4,4'-(propane-2,2-diyl)diphenol. More preferably, the coating composition is substantially free or completely free of any structural units derived from a dihydric phenol, or other polyhydric phenol, having estrogenic agonist activity greater than or equal to that of BPS. Even more preferably, the coating composition is substantially free or completely free of any structural units derived from a dihydric phenol, or other polyhydric phenol, having estrogenic agonist activity greater than 4,4'-(propane-2,2-diyl)bis(2,6-dibromophenol). Optimally, the coating composition is substantially free or completely free of any structural units derived from a dihydric phenol, or other polyhydric phenol, having estrogenic agonist activity greater than 2,2-bis(4-hydroxyphenyl)propanoic acid. The same is preferably true for any other components of a composition including the coating composition. See, for example, U.S. application Ser. No. 13/570,743 for a discussion of such structural units and applicable test methods. In some embodiments, the coating composition is substantially free, or even completely free, of structural units derived from bisphenols.

In some further embodiments, the coating composition is substantially free or completely free of any acrylamide-type monomers (e.g., acrylamides or methacrylamide). Moreover, in some embodiments, the coating composition is substantially free or completely free of styrene (whether free or polymerized). As discussed above, in these embodiments, the first-stage monomers and/or the second-stage monomers may include other ethylenically-unsaturated aromatic compounds and/or ethylenically-unsaturated alicyclic compounds, such as aromatic (meth)acrylates and/or alicyclic (meth)acrylates, for example. In additional further embodiments, the coating composition is substantially free or completely free of halogenated monomers (whether free or polymerized), such as chlorinated vinyl monomers.

The coating composition may also optionally be rheologically modified for different coating applications. For example, the coating composition may be diluted with additional amounts of the aqueous carrier to reduce the total solids content in the coating composition. Alternatively, portions of the aqueous carrier may be removed (e.g., evaporated) to increase the total solids content in the coating composition. The final total solids content in the coating composition may vary depending on the particular coating application used (e.g., spray coating), the particular coating use (e.g., for interior can surfaces), the coating thickness, and the like.

In some embodiments, the coating composition preferably has a total solids content greater than about 5%, more preferably greater than about 10%, and even more preferably greater than about 15%, based on the total weight of the coating composition. The coating composition also preferably has a total solids content less than about 80%, more preferably less than about 60%, and even more preferably less than about 50%, based on the total weight of the coating composition. The aqueous carrier may constitute the remainder of the weight of the coating composition.

In some embodiments, such as for certain spray coating applications (e.g., inside spray for food or beverage cans), the coating composition may have a total solids content greater than about 5%, more preferably greater than about 10%, and even more preferably greater than about 15%, based on the total weight of the coating composition. In these embodiments, the coating composition may also have a total solids content less than about 40%, more preferably less than about 30%, and even more preferably less than about 25%, based on the total weight of the coating composition. In some of these embodiments, the coating composition may have a total solids content ranging from about 18% to about 22%. The aqueous carrier may constitute the remainder of the weight of the coating composition.

The coating composition preferably includes at least a film-forming amount of the latex emulsion copolymers of the present disclosure. As such, the latex emulsion copolymers preferably constitute greater than about 50%, more preferably greater than about 65%, and even more preferably greater than about 80% by weight of the coating composition, based on an entire weight of the total solids in the coating composition. The latex emulsion copolymers may constitute 100% or less, more typically less than about 99%, and even more typically less than about 95% by weight of the coating composition, based on the entire weight of the total solids in the coating composition.

As previously discussed, the aqueous carrier of the coating composition preferably includes water and may further include one or more optional organic solvents. In some embodiments, water constitutes greater than about 20% by weight, more preferably greater than about 35% by weight, and even more preferably greater than about 50% by weight of the total weight of the aqueous carrier. In some embodiments, water constitutes 100% or less, more preferably less than about 95% by weight, and even more preferably less than about 90% by weight of the total weight of the aqueous carrier.

While not intending to be bound by theory, the inclusion of a suitable amount of an organic solvent can be advantageous, in some embodiments (e.g., for certain coil coating applications to modify flow and leveling of the coating composition, control blistering, and maximize the line speed of the coil coater). Accordingly, in certain embodiments, the organic solvents may constitute greater than 0%, more preferably greater than about 5%, and even more preferably greater than about 10% by weight of the aqueous carrier, based on the total weight of the aqueous carrier. In these embodiments, the organic solvents may also constitute less than about 60%, more preferably less than about 50%, and even more preferably less than about 40% by weight of the aqueous carrier, based on the total weight of the aqueous carrier.

The coating composition preferably has a viscosity suitable for a given coating application. In some embodiments, such as for certain spray coating applications (e.g., those discussed below for FIGS. 6 and 7), the coating composition may have an average viscosity greater than about 30 seconds, more preferably greater than 40 seconds, and even more preferably greater than about 45, based on the Viscosity Test described below. In some embodiments, the coating composition may also have an average viscosity less than about 90 seconds, more preferably less than 80 seconds, and even more preferably less than about 75, based on the Viscosity Test described below. Preferred inside spray coating compositions of the present disclosure are capable of being spray applied to an interior of a food or beverage can (e.g., a 2-piece food or beverage can) to effectively, and evenly, coat the substrate and form a continuous cured coating (e.g., a coating that exhibits a suitable initial metal exposure value, thereby indicating that the substrate has been effectively coated).

The coating composition of the present disclosure having the emulsion polymerized latex copolymers may be applied to a variety of different substrates using a variety of different coating techniques. As briefly described above, cured coatings formed from the coating composition are particularly suitable for use on food and beverage cans (e.g., two-piece cans, three-piece cans, and the like). Two-piece cans are typically manufactured by a drawn and ironing ("D&I") process. The cured coatings are also suitable for use in food or beverage contact situations, and may be used on the inside or outside of such cans.

Figure 5:
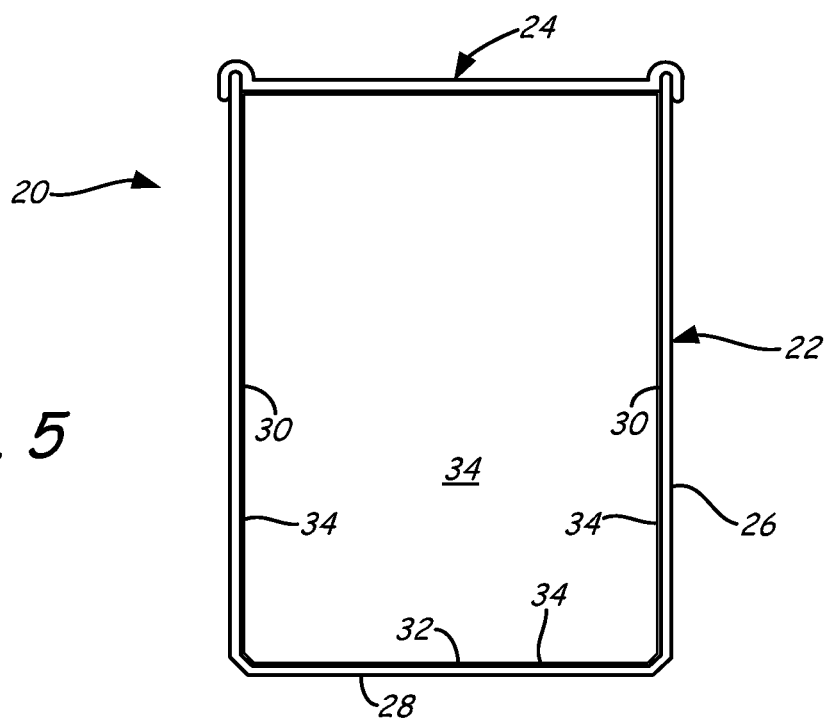
FIG. 5 is a schematic illustration of a two-piece food or beverage container having a coating formed from the coating composition of the present disclosure.

For instance, FIG. 5 shows container 20, which is a simplified example of a food or beverage container that may be coated with the coating composition of the present disclosure. Container 20 may be a two-piece can having body 22 and lid piece 24, where body 22 includes sidewall 26 and bottom end 28. Lid piece 24 may be sealed to body 22 in any suitable manner, and may optionally include one or more tabs (not shown) to facilitate peeling off or opening of lid piece 24 or a portion thereof (e.g., as is common for beverage can ends and easy-open food can ends).

Sidewall 26 and bottom end 28 respectively include interior surfaces 30 and 32, and suitable substrate materials for sidewall 26 and bottom end 28 include metallic materials, such as aluminum, iron, tin, steel, copper, and the like. One or more portions of interior surfaces 30 and 32 may be coated with coating 34, which is a cured coating formed from the latex emulsion of the present disclosure. In some embodiments, the interior surface of lid piece 24 may also be coated with coating 34. Alternatively, in some embodiments, the interior surface of lid piece 26 may be coated with coating 34, and interior surfaces 30 and 32 may be coated with other coating materials.

Furthermore, the coating composition is particularly suitable for spray applications for interior surfaces, such as the interior surfaces of food cans, beer and beverage containers, and the like. For example, the coating composition is particularly suitable for spray applications onto the interior surfaces (e.g., interior surfaces 30 and 32) of two-piece food or beverage cans (e.g., drawn and ironed beverage cans, which are typically made of steel or aluminum substrate).

Figure 6:
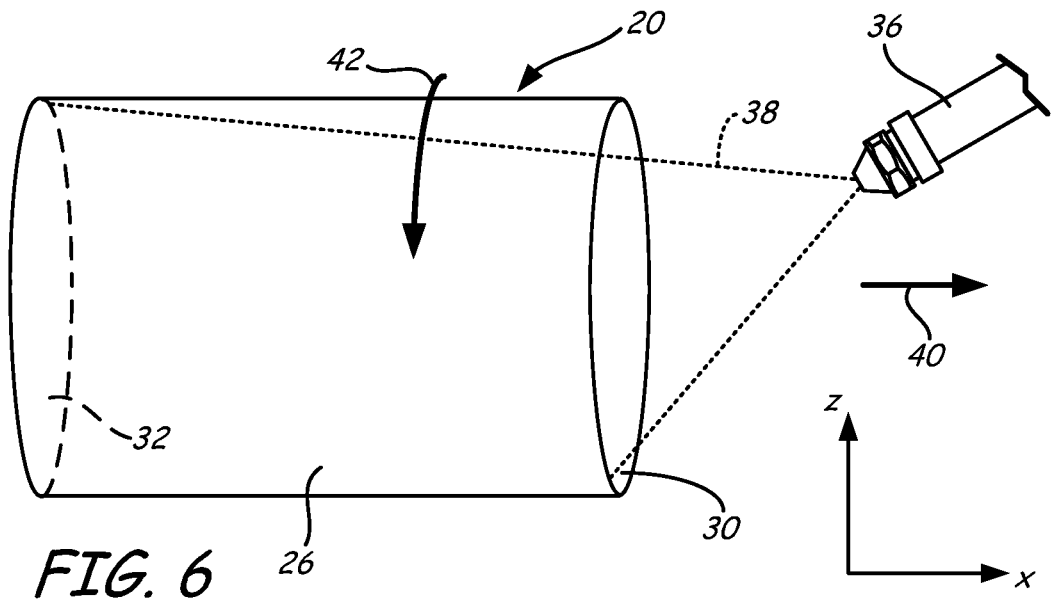
FIG. 6 is a side view of an example spray coating process for spraying the coating composition of the present disclosure onto an interior surface of a can, such as a food or beverage can. The y-axis extends into the page (away from the viewer).
Figure 7:
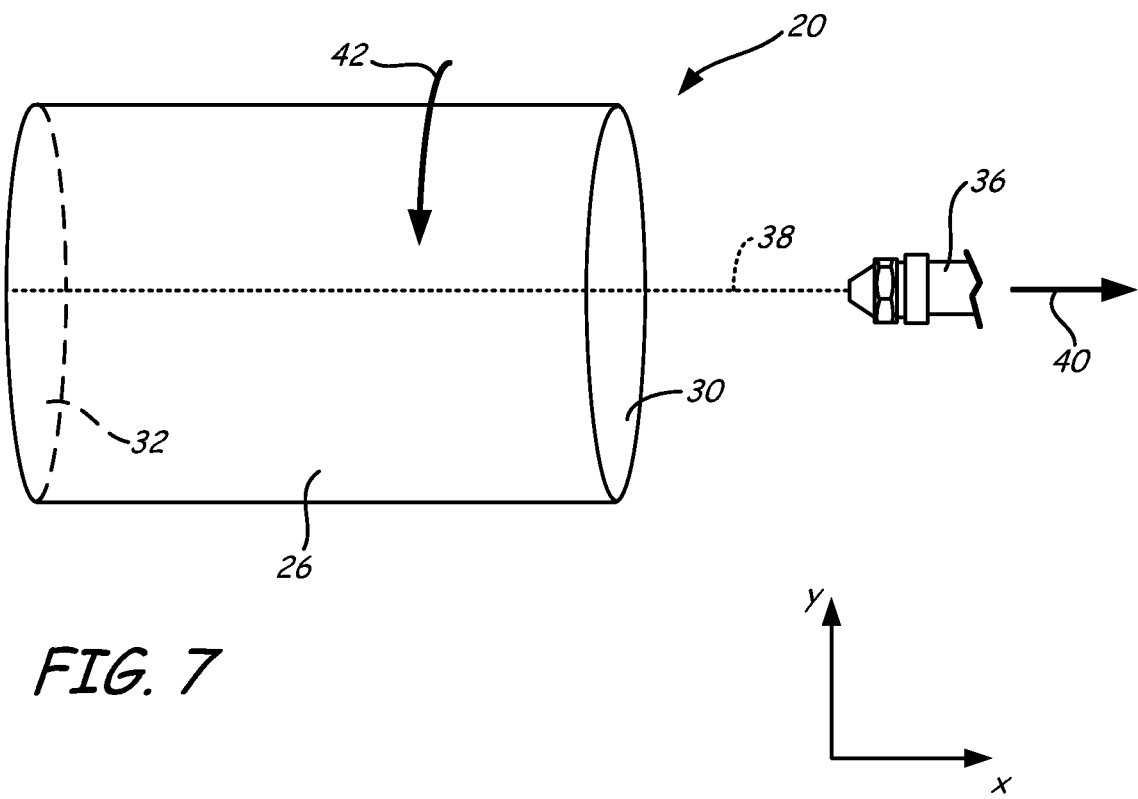
FIG. 7 is a top view of the example spray coating process shown in FIG. 6. The z-axis extends out of the page (towards the viewer).

A suitable spray coating technique for applying the coating composition to an interior surface of a food or beverage can may involve spraying the coating composition using a spray nozzle capable of uniformly coating the inside of the can. For example, FIG. 6 illustrates a side view, and FIG. 7 illustrates a top view of an example setup for spray coating the coating composition onto the interior surfaces 30 and 32 of a can 20 with a spray nozzle 36. As shown, the spray nozzle 36 is preferably a controlled-pattern nozzle capable of generating a desired spray pattern, such as spray 38 having a flat-fan pattern as generally illustrated in FIGS. 6 and 7.

Furthermore, spray nozzle 36 is preferably stationary, and also preferably generates spray 38 without air pressure (e.g., an airless spray operation). In some embodiments (e.g., in which the can to be sprayed is large), spray nozzle 36 may utilize a "lance spray" technique, where spray nozzle 36 may move relative to the can to reach the far inside end of the can.

In addition, the can 20 itself may be engaged to a rotating mechanism (e.g., a drive roller or belt, and/or a rotatable chuck mount), which is configured to rotate the can 20 at a high speed (e.g., about 2,200 rpm) around its longitudinal axis 40, as illustrated by arrows 42. This rotation of the can 20 preferably spreads the sprayed coating composition evenly across the entire interior surfaces 30 and 32. As can be seen in FIG. 6, the flat-fan pattern of spray 38 is not evenly aligned with the longitudinal axis 40 of the can 20. As such, the pattern of spray 38, as dictated by spray nozzle 36, may be non-homogenous, where the lower portion of spray 38 has a greater density of the coating composition compared to the upper portion of spray 38.

The embodiment illustrated in FIGS. 6 and 7 is directed to a single-spray nozzle assembly. In this embodiment, each can 20 may be positioned in proper registration with spray nozzle 36 (e.g., with a turret or other mechanism), rotated around its longitudinal axis 40, and sprayed with a sufficient quantity of the coating composition from spray nozzle 36. The rotation of the can 20 thereby distributes the coating composition across the interior surfaces 30 and 32 in a substantially even manner. After being sprayed with the coating composition, the can 20 may be moved away from spray nozzle 36, and another can 20 may be positioned in proper registration with spray nozzle 36 for a subsequent spray coating application.

In a second embodiment, such as for cans 20 having indented or otherwise particular corner seams between the sidewall 26 and bottom end 28, a two-nozzle spray coating technique may be used. In this embodiment, the can 20 may initially be positioned in proper registration with a first spray nozzle 36, and rotated around its longitudinal axis 40. The first spray nozzle 36 may then spray a thin band of the coating composition onto the corner seam of the can 20, at an intersection of interior surfaces 30 and 32. The rotation of the can 20 around its longitudinal axis 40 distributes the coating composition across the corner seam between the interior surfaces 30 and 32 in a substantially even manner.

Then, the can 20 may be moved and positioned in proper registration with a second spray nozzle 36, and rotated around its longitudinal axis 40. The second spray nozzle 36 may then spray a desired pattern of the coating composition onto the previously unsprayed portions of interior surface 30 and/or interior surface 32. The rotation of the can 20 around its longitudinal axis 40 distributes the coating composition across the sprayed portions of interior surfaces 30 and/or 32 in a substantially even manner.

After the spray coating application, each can 20 may be moved to a curing oven to cure the sprayed coating composition, which is preferably performed within about 40 to 200 seconds from the spraying step. The curing process is preferably performed in bulk with multiple cans 20 arranged together on a continuously moving conveyor belt or track. The curing oven preferably heats the cans 20 to a suitable temperature to cure the coating composition, but that is also preferably not too high so as to degrade the coating composition, any other existing coatings on cans 20, and/or the metal materials of cans 20.

Suitable curing temperatures for the coating composition of the present disclosure are greater than about 150° C. (about 300° F.), more preferably greater than about 165° C. (about 330° F.), and even more preferably greater than about 190° C. (about 374° F.). In some embodiments, suitable curing temperatures for the coating composition of the present disclosure are also less than about 230° C. (about 446° F.), more preferably less than about 225° C. (about 437° F.), and even more preferably less than about 220° C. (about 428° F.). These temperatures are based on peak metal temperature measurements of the metal walls of the cans 20 as they pass through the curing oven. For example, multiple cans 20 may be grouped together with a test can that is wired with thermocouples to measure the temperatures of one or more portions of the metal walls to ensure the cans 20 are heated enough.

Suitable residence times in the curing oven for the above-discussed temperatures range from about 40 seconds to about three minutes, more preferably about one minute to about two minutes. After curing, the resulting cured coatings (e.g., coating 34) may have suitable film thicknesses for protecting the cans 20 from food or beverage products that are subsequently filled into the cans 20.

The desired film thickness for the cured coating may vary depending on the particular food or beverage to be filled in a given can 20. In some embodiments for the spray coating application (e.g., inside spray for food or beverage cans), the average film thickness after curing is greater than about 0.7 milligrams/square-inch (mg/inch$^2$), more preferably greater than about 0.8 mg/inch$^2$, and even more preferably greater than about 0.9 mg/inch$^2$. In these embodiments, the average film thickness after curing is also less than about 4.0 mg/inch$^2$, more preferably less than about 3.0 mg/inch$^2$, and even more preferably less than about 2.5 mg/inch$^2$.

In some further embodiments, the average film thickness after curing ranges from about 0.9 mg/inch$^2$ to about 1.1 mg/inch$^2$. In other further embodiments, the average film thickness after curing ranges from about 1.4 mg/inch$^2$ to about 1.6 mg/inch$^2$. In yet other further embodiments, the average film thickness after curing ranges from about 1.9 mg/inch$^2$ to about 2.1 mg/inch$^2$.

Alternatively, the coating composition may applied as a coil coating. During a coil coating application, a continuous coil composed of a metal (e.g., steel or aluminum) is coated with the coating composition of the present disclosure. Once coated, the coating coil may be subjected to a short thermal, ultraviolet, and/or electromagnetic curing cycle, for hardening (e.g., drying and curing) of the coating composition. Coil coatings provide coated metal (e.g., steel and/or aluminum) substrates that can be fabricated into formed articles, such as two-piece drawn food cans, food can ends, drawn and ironed cans, beverage can ends, and the like.

The coating composition of the present disclosure also offers utility in other coating applications. These additional applications include, but are not limited to, wash coating, sheet coating, and side seam coatings (e.g., food can side seam coatings).

Other commercial coating application and curing methods are also envisioned, for example, electrocoating, extrusion coating, laminating, powder coating, and the like. The coating composition may also be useful in medical or cosmetic packaging applications, including, for example, on surfaces of metered-dose inhalers ("MDIs"), including on drug-contact surfaces.

During the above-discussed curing steps, the aqueous carrier is preferably vaporized or otherwise dried off from the emulsion polymerized copolymers, allowing them to cure. If desired, the drying and curing steps may be combined in a single step or carried out in separate steps. As discussed above, this curing is believed to cause the curing groups 18, when present, to react with the step-growth-functional groups of the first-stage copolymers. This can further crosslinks the first-stage copolymers and the second-stage copolymers, which increases the crosslinking density of the resulting cured coating.

In fact, in some embodiments, the coating composition may be cured with good crosslinking density without the use of an external crosslinker. For example, after curing, preferred coatings produced from the coating composition of the present disclosure without an external crosslinker may withstand more than 100 double rubs, more preferably greater than 200 double rubs, and even more preferably greater than 300 double rubs, based on the Solvent Resistance test discussed below.

This is in addition to the combination of good corrosion resistance and good sprayability and flexibility, which is believed to be attained from the partially-crosslinked network of the copolymers that are interconnected with the copolymer linkages 14a. For example, after curing, the coating composition preferably exhibits corrosion resistance in deionized water, Joy detergent solution, an acetic acid solution, a citric acid solution, and a cider solution as shown below in Table 7 of the Examples section.

Furthermore, after curing, the coating composition preferably exhibits a flexibility sufficient to maintain no damage after being subjected to the Metal Exposure after Drop Damage test described below. The cured coating also preferably withstands necking processes to form can reduced-diameter necks without exhibiting any damage. Moreover, the cured coating preferably exhibits wedge bend results of 50% or greater of non-corroded bands when subjected to the Wedge Bend test described below.

Even more preferably, the cured coatings exhibit combinations of the above properties, including the Solvent Resistance test results, the Corrosion Resistance test results, and the flexibility results. This is in addition to being suitable for use in spray coating applications to form spray coatings on interior can surfaces. Accordingly, the coating composition of the present disclosure is particularly suitable for use as food and beverage-contact coatings in containers (or portions thereof) configured retain a variety of different food or beverage products, including particularly challenging products to pack such as, for example, alcoholic cider.

PROPERTY ANALYSIS AND CHARACTERIZATION PROCEDURES

Various properties and characteristics of the latex emulsions, coating compositions, and coatings described herein may be evaluated by various testing procedures as described below:

1. Curing Conditions

For beverage inside spray bakes, the curing conditions involve maintaining the temperature measured at the can dome at 188° C. to 210° C. for 60 seconds. For beverage end coil bakes, the curing conditions involve the use of a temperature sufficient to provide a peak metal temperature within the specified time (e.g., 10 seconds at 204° C. means 10 seconds, in the oven, for example, and a peak metal temperature achieved of 204° C.). The constructions cited were evaluated by tests as follows.

2. Solvent Resistance

The extent of cure or crosslinking of a coating is measured as a resistance to methyl ethyl ketone (MEK, available from Exxon, Newark, N.J.). This test is performed as described in ASTM D 5402-93. The number of double-rubs (i.e., one back- and forth motion) is reported.

3. Adhesion

Adhesion testing is performed to assess whether the coating adheres to the coated substrate. The adhesion test was performed according to ASTM D 3359—Test Method B, using SCOTCH 610 tape, available from 3M Company of Saint Paul, Minn. Adhesion is generally rated on a scale of 0-10 where a rating of "0" indicates no adhesion failure (best), a rating of "1" indicates 90% of the coating remains adhered, a rating of "2" indicates 80% of the coating remains adhered, and so on. Adhesion ratings of 0 are typically desired for commercially viable coatings.

4. Blush Resistance

Blush resistance measures the ability of a coating to resist attack by various solutions. Typically, blush is measured by the amount of solution (e.g., water) absorbed into a coated film. When the film absorbs water, it generally becomes cloudy or looks white. Blush is generally measured visually using a scale of 0-10 where a rating of "0" indicates no blush (best) and a rating of "10" indicates complete whitening of the film (worst). Blush ratings of 3 or less are typically desired for commercially viable coatings, and optimally 1 or less.

5. Blush Adhesion Resistance

Blush Adhesion Resistance is a combination of adhesion resistance and blush resistance results as described above for the Adhesion test and the Bush Resistance test.

6. Corrosion Resistance

These tests measure the ability of a coating to resist attack by solutions of different levels of aggressiveness. Briefly, a given coating is subjected to a particular solution, as described below, and then measured for adhesion and blush resistance, each also described below. For each test, a result is given using a scale of 0-10, based on the adhesion and blush resistance, where a rating of "0" is best and a rating of "10 is worst. Commercially viable beverage interior coatings preferably give adhesion ratings of 0 and blush ratings of less than 3, optimally less than 1, in the given solutions tested.

A. Deionized Water

Deionized water is heated to 82° C. Coated panels are immersed in the heated solution for 30 minutes and then removed, rinsed, and dried. Samples are then evaluated for adhesion and blush, as previously described.

B. Joy Detergent Solution

A 1% solution of JOY Detergent (available from Procter & Gamble) in deionized water is prepared and heated to 82° C. Coated panels are immersed in the heated solution for 10 minutes and then removed, rinsed, and dried. Samples are then evaluated for adhesion and blush, as previously described.

C. Acetic Acid Solution

A 3% solution of acetic acid ($C_2H_4O_2$) in deionized water is prepared and heated to 100° C. Coated panels are immersed in the heated solution for 30 minutes and then removed, rinsed, and dried. Samples are then evaluated for adhesion and blush, as previously described.

D. Citric Acid Solution

A 2% solution of citric acid ($C_6H_8O_7$) in deionized water is prepared and heated while subjected to a pressure sufficient to achieve a solution temperature of 121° C. Coated panels are immersed in the heated solution for 30 minutes and then removed, rinsed, and dried. Samples are then evaluated for adhesion and blush, as previously described.

E. Cider Solution

A cider solution of 32.4 grams/liter malic acid, 9.6 grams/liter lactic acid, 12.9 grams/liter acetic acid, and 125 milligrams/liter sodium sulfite is prepared and heated to 37° C. Coated panels are immersed in the heated solution for 24 hours and then removed, rinsed, and dried. Samples are then evaluated for adhesion and blush, as previously described.

7. Crazing-Reverse Impact Resistance (RIR)

The reverse impact measures the coated substrate's ability to withstand the deformation encountered when impacted by a steel punch with a hemispherical head. For the present evaluation, coated substrate was subjected to 12 in-lbs (1.36 N m) of force using a BYK-Gardner "overall" Bend and Impact Tester and rated visually for micro-cracking or micro-fracturing commonly referred to as crazing. Test pieces were impacted on the uncoated or reverse side. A rating of 0 indicates no craze and suggests sufficient flexibility and cure. A rating of 10 indicates complete failure. Commercially viable coatings preferably show slight or no crazing on a reverse impact test.

8. Impact on Dome

Dome impact was evaluated by subjecting the dome apex of a 12-ounce beverage can to a reverse impact as described in the previous section. Craze was evaluated after impact. A rating of 0 indicates no craze and suggests sufficient flexibility and cure. A rating of 10 indicates complete failure. Coatings for beverage can interiors preferably show no craze (rating of 0) on a dome impact test.

9. Wedge-Bend

This is a flexibility test for a coating, and correlates to how a coating will withstand a can formation process (e.g., necking steps). Test coatings are applied to a suitable panel and cured. The coated panel is then bent around a 5-millimeter diameter metal rod having a 15-centimeter length. The bent panel is then flattened with a 2,400-gram hammer along its length with a folding height ranging between zero millimeters and six millimeters. The resulting panel is then immersed in 10% hydrochloric acid (provided at a 36% concentration)/copper sulphate solution for a 3-minute duration. The corrosion is then rated by measuring the wedge bend length that is not corroded, and is expressed as a percentage of the overall wedge bend length.

10. Sterilization or Pasteurization

The sterilization or pasteurization test determines how a coating withstands the processing conditions for different types of food products packaged in a container. Typically, a coated substrate is immersed in a water bath and heated for 5-60 minutes at temperatures ranging from 65° C. to 100° C. For the present evaluation, the coated substrate was immersed in a deionized water bath for 45 minutes at 85° C. The coated substrate was then removed from the water bath and tested for coating adhesion and blush as described above. Commercially viable coatings preferably provide adequate pasteurization resistance with perfect adhesion (rating of 0) and blush ratings of 5 or less, optimally 1 or less.

11. Process or Retort Resistance

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization test. Testing is accomplished by subjecting the substrate to heat ranging from 105-130° C. and pressure ranging from 0.7 to 1.05 kilograms/square-centimeter for a period of 15 to 90 minutes.

For the present evaluation, the coated substrate is immersed in deionized water and subjected to heat of 121° C. (250° F.) and pressure of 1.05 kilograms/square-centimeter for a period of 90 minutes. The coated substrate is then tested for adhesion and blush as described above. In food or beverage applications requiring retort performance, adhesion ratings of 0 and blush ratings of 3 or less are typically desired for commercially viable coatings.

12. Global Extractions

The global extraction test is designed to estimate the total amount of mobile material that can potentially migrate out of a coating and into food packed in a coated can. Typically coated substrate is subjected to water or solvent blends under a variety of conditions to simulate a given end use. Acceptable extraction conditions and media can be found in 21 CFR § 175.300 paragraphs (d) and (e). The allowable global extraction limit as defined by the FDA regulation is 50 parts per million (ppm).

The extraction procedure used in the current invention is described in 21 CFR § 175.300 paragraph (e)(4)(xv) with the following modifications to ensure worst-case scenario performance: (1) the alcohol (ethanol) content was increased to 10% by weight, and (2) the filled containers were held for a 10-day equilibrium period at 37.8° C. (100° F.). These conditions are per the FDA publication "Guidelines for Industry" for preparation of Food Contact Notifications.

The coated beverage can is filled with 10% by weight aqueous ethanol and subjected to pasteurization conditions (65.6° C., 150° F.) for 2 hours, followed by a 10-day equilibrium period at 37.8° C. (100° F.). Determination of the amount of extractives is determined as described in 21 CFR § 175.300 paragraph (e) (5), and ppm values were calculated based on surface area of the can (no end) of 44 square inches with a volume of 355 milliliters. Preferred coatings give global extraction results of less than 50 ppm, more preferred results of less than 10 ppm, even more preferred results of less than 1 ppm. Most preferably, the global extraction results are optimally non-detectable.

13. Initial Metal Exposure

This test method determines the amount of the inside surface of the can that has not been effectively coated by the sprayed coating. This determination is made through the use of an electrically conductive solution (1% NaCl in deionized water). The coated can is filled with this room-temperature conductive solution, and an electrical probe is attached in contact to the outside of the can (uncoated, electrically conducting). A second probe is immersed in the salt solution in the middle of the inside of the can.

If any uncoated metal is present on the inside of the can, a current is passed between these two probes and registers as a value on an LED display. The LED displays the conveyed currents in milliamps (mA). The current that is passed is directly proportional to the amount of metal that has not been effectively covered with coating. The goal is to achieve 100% coating coverage on the inside of the can, which would result in an LED reading of 0.0 mA. Preferred coatings give metal exposure values of less than 3 mA, more preferred values of less than 2 mA, and even more preferred values of less than 1 mA. Commercially acceptable metal exposure values are typically less than 2.0 mA on average.

14. Viscosity Test

This test measures the viscosity of a latex emulsion or coating composition for rheological purposes, such as for sprayability and other coating application properties. The test was performed pursuant to ASTM D1200-88 using a Ford Viscosity Cup #2 at 80° F. The results are measured in the units of seconds.

EXAMPLES

The present disclosure is more particularly described in the following examples that are intended as illustrations only, since numerous modifications and variations within the scope of the present disclosure will be apparent to those skilled in the art. The following Table 1 lists some of the raw materials used in the following examples. Alternative materials or suppliers may be substituted as is appreciated to one skilled in the art.

TABLE 1

| Raw Material | Trade Name | Supplier |
| --- | --- | --- |
| Polyermizable Surfactant Monomer | REASOAP SR1025 | Adeka Corporation, Tokyo, Japan |
| Organic Acid Catalyst, 25% in ammonia | CYCAT 600 | Cyctec Industries, Inc., Woodland Park, NJ |
| Ammonium Persulphate | | Sigma-Aldrich Co. LLC, St. Louis, MO |
| Styrene | | Rohm & Haas, Philadelphia, PA |
| Methacrylic Acid | | Rohm & Haas, Philadelphia, PA |
| Ethyl Acrylate | | Rohm & Haas, Philadelphia, PA |
| Hydroxyethyl Methacrylate (HEMA) | | Rohm & Haas, Philadelphia, PA |
| Butyl Glycol | | The DOW Chemical Co., Midland, MI |
| Dimethylethanol Amine (DMEA) | | BASF SE, Ludwigshafen, Germany |
| Phenothiazine | | Sigma-Aldrich Co. LLC, St. Louis, MO |
| Glycidyl Methacrylate (GMA) | | Rohm & Haas, Philadelphia, PA |
| Ferrous Sulphate Heptahydrate | | Sigma-Aldrich Co. LLC, St. Louis, MO |
| Tertioamyl Hydroperoxide | TAH 85 | Arkema, Inc., Colombes, France |
| Isoascorbic Acid | | Sigma-Aldrich Co. LLC, St. Louis, MO |
| Amine-Neutralized Dodecylbenzne Sulfonic Acid (non-polyermizable surfactant) | NACURE 5925 | Cyctec Industries, Inc., Woodland Park, NJ |
| Benzyl Methacrylate | | Rohm & Haas, Philadelphia, PA |
| Isobornyl Acrylate | | Rohm & Haas, Philadelphia, PA |
| Acrylic Acid | | Rohm & Haas, Philadelphia, PA |
| Phenolic Resole Resin Crosslinker | | Valspar Corporation, Minneapolis, MN |

Coating Composition CC1

A coating composition CC1 was prepared using the above-discussed two-stage polymerization process. For the first-stage polymerization, 2,765 parts of deionized water, 31.5 parts of the polymerizable surfactant monomer, and 14 parts of the organic acid catalyst were added to a reactor equipped, which was then heated under nitrogen sparge to 80° C. with agitation. Once equilibrium temperature was reached, an initiator solution and the first-stage monomers were introduced to the surfactant dispersion in the reactor continuously over a 75-minute duration while the reactor was maintained under nitrogen sparge at the temperature of 80° C. with agitation.

The initiator solution included 16.45 parts of ammonium persulphate and 140 parts of deionized water. The first-stage monomers included 475.65 parts styrene, 227.5 parts methacrylic acid, 122.5 parts ethyl acrylate, and 94.5 parts hydroxyethyl methacrylate (HEMA), which were carried in 70 parts of a buytl glycol solvent. After all of the initiator solution and the first-stage monomers were added, the reactor was held at the temperature of 80° C. under agitation for an additional 30 minutes to complete the first-stage emulsion polymerization, thereby producing an in situ latex emulsion having the first-stage copolymers. These first-stage copolymers included chain segments of the polymerizable surfactant monomer, and carboxylic acid groups.

A portion of the carboxylic acid groups of the resulting first-stage copolymers was then neutralized for water-dispersibility purposes. This included introducing 16.45 parts of dimethylethanol amine (DMEA) and 340.2 parts of deionized water over a period of 60 minutes. After neutralization, an inhibitor solution of 0.0049 parts phenothiazine and 4.9 parts butyl glycol was added to the reactor to inhibit further polymerization. The in situ latex emulsion was agitated at the temperature of 80° C. for an additional five minutes.

38.5 parts of glycidyl methacrylate was then introduced to the reactor to react with some of the remaining carboxylic acid groups of the first-stage copolymers using a step-growth reaction. After the glycidyl methacrylate was introduced, the reactor was agitated at the temperature of 80° C. for three hours to complete the step-growth reaction. During the step-growth reaction, the oxirane groups of the glycidyl methacrylate reacted with the carboxylic acid groups of the first-stage copolymers to graft the glycidyl methacrylate chains to the first-stage copolymers via ester linkages. This produced linkage groups characterized as pendant ester segments with terminated with vinyl groups.

After the linkage group grafting step was completed, a redox solution was introduced to the reactor, which included 0.0056 parts of ferrous sulphate heptahydrate, 1.12 parts of tertioamyl hydroperoxide, and 56 parts of deionized water. Then a second initiator solution and the second-stage monomers were introduced to the reactor continuously over a 75-minute duration while the reactor was maintained under nitrogen sparge at the temperature of 80° C. with agitation.

The second initiator solution included 1.12 parts of isoascorbic acid, 0.56 parts of dimethylethanol amine (DMEA), and 120 parts of deionized water. The second-stage monomers included 504 parts styrene, 154 parts glycidyl methacrylate (i.e., for the curing groups), 147 parts ethyl acrylate, and 38.5 parts hydroxyethyl methacrylate (HEMA), which were carried in 105 parts of a buytl glycol solvent.

After all of the second initiator solution and the second-stage monomers were added, the reactor was held at the temperature of 80° C. under agitation for an additional 45 minutes to complete the second-stage emulsion polymerization, thereby producing a latex emulsion having the first-stage copolymers linked to the second-stage copolymers via copolymer linkages. The second-stage copolymers also included oxirane curing groups for a subsequent curing step. After the second-stage polymerization was completed, the reactor was slowly cooled down to 40° C. and filtered to collect the resulting latex emulsion, where no coagulum was visibly observable.

The resulting latex emulsion had a total solids content of 33.7% by weight, an acid number of 75 mg KOH per gram of the resulting latex emulsion copolymers, a viscosity of 16 seconds based on the Viscosity Test, and a pH of 7. The resulting latex emulsion copolymers included monomer concentrations as listed below in Table 2.

TABLE 2

| | Percent by weight |
| --- | --- |
| First-Stage Monomers and Linkage Monomers | |
| Polyermizable Surfactant Monomer | 3.2 |
| Styrene | 48.0 |
| Methacrylic Acid | 23.0 |
| Ethyl Acrylate | 12.4 |

TABLE 2-continued

| | Percent by weight |
|---|---|
| Hydroxyethyl Methacrylate (HEMA) | 9.5 |
| Glycidyl Methacrylate (GMA) - Linkage Monomers | 3.9 |
| Second-Stage Monomers | |
| Styrene | 59.8 |
| Glycidyl Methacrylate (GMA) | 18.3 |
| Ethyl Acrylate | 17.4 |
| Hydroxyethyl Methacrylate (HEMA) | 4.6 |
| Total Monomers | |
| First-Stage Monomers | 51.9 |
| Linkage Monomers | 2.1 |
| Second-Stage Monomers | 46.0 |

Accordingly, the resulting latex emulsion copolymers included first-stage copolymers having chain segments polymerized from the polymerizable surfactant monomer, and also included carboxylic acid groups (at least some of which were in neutralized salt form) and grafted copolymer linkage with ester segments. The second-stage copolymers of the resulting latex emulsion copolymers are believed to be covalently attached to the first-stage copolymers via the copolymer linkages, and also included oxirane curing groups.

The resulting latex emulsion was then diluted with a solution of deionized water and organic solvents to reach a viscosity between 15 and 25 seconds based on the Viscosity Test. This resulted in the coating composition CC1, which did not included any external crosslinker.

Coating Compositions CC2 and CC3

Coating compositions CC2 and CC3 were prepared using the same above-discussed two-stage polymerization process as used to produce the coating composition CC1. However, the coating compositions CC2 and CC3 did not include any polymerizable surfactant monomers. The latex emulsion for the coating compositions CC2 and CC3 had a total solids content of 33.8% by weight, an acid number of 75.5 mg KOH per gram of the resulting latex emulsion copolymers, a viscosity of 25 seconds based on the Viscosity test, and a pH of 6.9. The latex emulsion copolymers included monomer concentrations as listed below in Table 3.

TABLE 3

| | Percent by weight |
|---|---|
| First-Stage Monomers and Linkage Monomers | |
| Polyermizable Surfactant Monomer | 0.0 |
| Styrene | 49.6 |
| Methacrylic Acid | 23.7 |
| Ethyl Acrylate | 12.8 |
| Hydroxyethyl Methacrylate (HEMA) | 9.9 |
| Glycidyl Methacrylate (GMA) - Linkage Monomers | 4.0 |
| Second-Stage Monomers | |
| Styrene | 59.8 |
| Glycidyl Methacrylate (GMA) | 18.3 |
| Ethyl Acrylate | 17.4 |
| Hydroxyethyl Methacrylate (HEMA) | 4.6 |
| Total Monomers | |
| First-Stage Monomers | 51.1 |
| Linkage Monomers | 2.1 |
| Second-Stage Monomers | 46.8 |

The resulting latex emulsion copolymers were then diluted with a solution of deionized water and organic solvents to reach a viscosity between 15 and 25 seconds based on the Viscosity Test. This resulted in the coating composition CC2, which did not include any external crosslinker. However, for the coating composition CC3, a phenolic resole resin crosslinker was included to provide additional crosslinking.

Coating Composition CC4

A coating composition CC4 was also prepared using the same above-discussed two-stage polymerization process as used to produce the coating composition CC1. However, the coating composition CC4 did not include any styrene. Instead, the coating composition CC4 included an aromatic methacrylate in lieu of the styrene.

During the second-stage polymerization, after all of the second initiator solution and the second-stage monomers were added, the reactor was held at the temperature of 80° C. under agitation for an additional 45 minutes. Then a spike of the initiator and redox solutions was added to reduce the level of free monomers. The spike included 0.001 parts of ferrous sulphate heptahydrate, 0.3 parts of tertioamyl hydroperoxide, 0.2 parts of isoascorbic acid, 0.12 parts of DMEA, and 10 parts of deionized water. The reactor was maintained under nitrogen sparge at the temperature of 80° C. with agitation for an additional two hours to complete the second-stage emulsion polymerization, thereby producing a latex emulsion of the present disclosure.

After the second-stage polymerization was completed, the reactor was slowly cooled down to 40° C. and filtered to collect the resulting latex emulsion, where no coagulum was visibly observable. The resulting latex emulsion had a total solids content of 33.0% by weight. The resulting latex emulsion copolymers included monomer concentrations as listed below in Table 4.

TABLE 4

| | Percent by weight |
|---|---|
| First-Stage Monomers and Linkage Monomers | |
| Polyermizable Surfactant Monomer | 2.8 |
| Benzyl Methacrylate | 52.8 |
| Methacrylic Acid | 19.4 |
| Isobomyl Acrylate | 17.6 |
| Hydroxyethyl Methacrylate (HEMA) | 3.5 |
| Glycidyl Methacrylate (GMA) - Linkage Monomers | 3.9 |
| Second-Stage Monomers | |
| Benzyl Methacrylate | 44.8 |
| Glycidyl Methacrylate (GMA) | 18.3 |
| Ethyl Acrylate | 17.4 |
| Isobomyl Acrylate | 14.9 |
| Hydroxyethyl Methacrylate (HEMA) | 4.6 |
| Total Monomers | |
| First-Stage Monomers | 51.1 |
| Linkage Monomers | 2.1 |
| Second-Stage Monomers | 46.8 |

The resulting latex emulsion was then diluted with a solution of deionized water and organic solvents to reach a viscosity between 15 and 25 seconds based on the Viscosity Test. This resulted in the coating composition CC4, which did not include any external crosslinker.

Coating Composition CC5

A coating composition CC5 was also prepared using the same above-discussed two-stage polymerization process as used to produce the coating composition CC1. However, the coating composition CC5 did not include any linkage monomers.

Instead, after the neutralization step, the second-stage polymerization process was performed. During the second-stage polymerization, after all of the second initiator solution and the second-stage monomers were added, the reactor was held at the temperature of 80° C. under agitation for an additional 30 minutes. Then a spike of the initiator and redox solutions was added to reduce the level of free monomers. The spike included 0.001 parts of ferrous sulphate heptahydrate, 0.3 parts of tertioamyl hydroperoxide, 0.2 parts of isoascorbic acid, and 10 parts of deionized water. The reactor was maintained under nitrogen sparge at the temperature of 80° C. with agitation for an additional 90 minutes to complete the second-stage emulsion polymerization, thereby producing a latex emulsion.

After the second-stage polymerization was completed, the reactor was slowly cooled down to 40° C. and filtered to collect the resulting latex emulsion, where no coagulum was visibly observable. The resulting latex emulsion had a total solids content of 31.8% by weight, an acid number of 66 mg KOH per gram of the resulting latex emulsion copolymers, a viscosity of 15 seconds based on the Viscosity Test, and a pH of 6.9. The resulting latex emulsion copolymers included monomer concentrations as listed below in Table 5.

TABLE 5

| | Percent by weight |
|---|---|
| First-Stage Monomers and Linkage Monomers | |
| Polyermizable Surfactant Monomer | 6.4 |
| Styrene | 51.2 |
| Methacrylic Acid | 19.6 |
| Ethyl Acrylate | 13.2 |
| Hydroxyethyl Methacrylate (HEMA) | 9.6 |
| Linkage Monomers | 0.0 |
| Second-Stage Monomers | |
| Styrene | 57.1 |
| Glycidyl Methacrylate (GMA) | 21.8 |
| Ethyl Acrylate | 16.7 |
| Hydroxyethyl Methacrylate (HEMA) | 4.4 |
| Total Monomers | |
| First-Stage Monomers | 52.7 |
| Linkage Monomers | 0.0 |
| Second-Stage Monomers | 47.3 |

The resulting latex emulsion was then diluted with a solution of deionized water and organic solvents to reach a viscosity between 15 and 25 seconds based on the Viscosity Test. This resulted in the coating composition CC5, which did not include any external crosslinker.

Coating Evaluations for Coating Compositions CC1-CC5

For each coating composition CC1-CC7, the coating composition was applied to flat aluminum and steel panels with an applied coating thickness of 4 grams/square-meter. Each applied coating composition was then cured for 60 seconds at a temperature of 193° C. to produce cured coatings. Each coating was then evaluated for use as an internal surface-coating for two-piece beverage cans, with involved subjecting the coating to corrosion resistance tests in different solutions, solution stability tests, and reverse impact crazing tests.

A. Solvent Resistance Testing

The applied and cured coatings for coating composition CC1-CC5 were subjected to Solvent Resistance tests to determine their extents of crosslinking. Comparative coatings produced from an epoxy-based coating composition were also tested for comparison. Table 6 lists the Solvent Resistance test results for the coating compositions CC1-CC5 and the epoxy-based control for (i) initial coatings, and (ii) coatings aged for one month at 50° C., where the results are in a number of double rubs.

TABLE 6

| Coating Composition | Solution Stability Test Results (Initial) | Solution Stability Test Results (Aged) |
|---|---|---|
| Coating Composition CC1 | 400 | 400 |
| Coating Composition CC2 | 400 | 400 |
| Coating Composition CC3 | 400 | 400 |
| Coating Composition CC4 | 320 | 310 |
| Coating Composition CC5 | 240 | 230 |
| Epoxy control | 120 | 120 |

As shown in Table 6, the coating compositions CC1-CC4, having the copolymer linkages between the first-stage copolymers and the second-stage copolymers exhibited high levels of crosslinking regardless of whether an external crosslinker was used. As such, the coating compositions of the present disclosure having the copolymer linkages may be utilized without phenolic resole crosslinkers, allowing them to be substantially free of formaldehyde-based materials, if desired. Furthermore, the coating compositions CC1-CC4 maintained the ability to generate high levels of crosslinking even after the aging conditions. This illustrates the good curing stability of these coating compositions.

B. Corrosion Resistance Testing

The applied and cured coatings for coating composition CC1-CC5 were also subjected to various corrosion resistance tests pursuant to the above-described procedures for deionized water, the Joy detergent solution, the acetic acid solution, the citric acid solution, and the cider solution. A comparative coating produced from an epoxy-based coating composition were also tested for comparison. Table 7 lists the Blush Adhesion Resistance results for the coating compositions CC1-CC5 and the epoxy-based control.

TABLE 7

| Corrosion Test Solution | Coating Composition CC1 | Coating Composition CC2 | Coating Composition CC3 | Coating Composition CC4 | Coating Composition CC5 | Epoxy control |
|---|---|---|---|---|---|---|
| Deionized Water | 0 | 0 | 0 | 0 | 0 | 0 |
| Joy Detergent Solution | 0 | 0 | 0 | 0 | 0 | 0 |
| Acetic Acid Solution | 5 | 5 | 0 | 0 | 4 | 0 |

TABLE 7-continued

| Corrosion Test Solution | Coating Composition CC1 | Coating Composition CC2 | Coating Composition CC3 | Coating Composition CC4 | Coating Composition CC5 | Epoxy control |
|---|---|---|---|---|---|---|
| Citric Acid Solution | 1 | 1 | 0 | 1 | 2 | 0 |
| Cider Solution | 4 | 3 | 0 | 2 | 1 | 0 |

As shown in Table 7, the coatings exhibited suitable corrosion resistance. Particularly, the coating composition CC3, which included the external phenolic crosslinker, exhibited good corrosion resistance to all of the tested solutions, regardless of the aggressiveness.

C. Crazing Reverse Impact Resistance (RIR) Testing

The applied and cured coatings for coating composition CC1-CC5 were subjected to the Crazing RIR testing, as described above, to measure the coated substrate's ability to withstand the deformation encountered when impacted by a steel punch with a hemispherical head. Table 8 lists the Crazing RIR test results for the coating compositions CC1-CC7 and the epoxy-based control for (i) initial coatings, (ii) uncured coating compositions aged for 15 days at 50° C. (and then applied and cured before testing), and (iii) uncured coating compositions aged for one month at 50° C. (and then applied and cured before testing).

TABLE 8

| Coating Composition | Crazing RIR (Initial) | Crazing RIR (15 Days) | Crazing RIR (1 Month) |
|---|---|---|---|
| Coating Composition CC1 | 0 | 0 | 0 |
| Coating Composition CC2 | 0 | 0 | 0 |
| Coating Composition CC3 | 0 | 0 | 0 |
| Coating Composition CC4 | 1 | 1 | — (1) |
| Coating Composition CC5 | 0 | 3 | — (1) |
| Epoxy control | 0 | 0 | 0 |

(1) Not tested for this aged period

As shown in Table 8, the coating compositions exhibited good impact resistance, particularly the coating compositions of CC1-CC3 having the copolymer linkages and styrene. While not wishing to be bound by theory, it is believed that the copolymer linkages provide higher crosslinking densities, regardless of whether an external crosslinker is included. The higher crosslinking densities accordingly are believed to improve impact resistances for the coated substrates.

D. Wedge Bend Testing

The applied and cured coatings for coating compositions CC2, CC4, and CC5 were also subjected to the wedge bend testing prior to aging, which correlates to how well the coatings will withstand the can forming process (e.g., necking). Table 9 lists the Wedge Bend test results for the coating compositions CC2, CC4, and CC5 and the epoxy-based control

TABLE 9

| Coating Composition | Wedge Bend Test Results |
|---|---|
| Coating Composition CC2 | 60% |
| Coating Composition CC4 | 46% |
| Coating Composition CC5 | 60% |
| Epoxy control | 75% |

As shown in Table 9, the coating compositions CC2, CC4, and CC5 exhibited good flexibilities. Accordingly, the coating compositions, particularly coating composition CC4, may be applied to interior surfaces of cans prior to can formation processes (e.g., necking steps).

Coating Compositions CC6 and CC7

Coating compositions CC6 and CC7 were prepared using the above-discussed two-stage polymerization process as used to produce the coating composition CC1. However, the coating compositions CC6 and CC7 did not include any polymerizable or non-polymerizable surfactant, and did not include any linkage monomers. Instead, these coating compositions illustrate how the first-stage monomers and the second-stage monomers may be sufficiently dispersed in an aqueous carrier without the use of separate surfactants to undergo emulsion polymerization processes. If desired, the following process discussed below for producing the coating compositions CC6 and CC7 may also be modified to incorporate linkage group grafting as discussed above for the coating compositions CC1CC4.

For both coating compositions CC6 and CC7, the ammonium persulphate sufficiently dispersed the first-stage monomers and the second-stage monomers, and the resulting copolymers, in the aqueous carrier without the use of separate surfactants. After polymerization, the resulting latex copolymers were then neutralized to assist in maintaining water dispersibiltiy.

For the coating composition CC6, the resulting latex emulsion had a total solids content of 34.4% by weight, an acid number of 73.8 mg KOH per gram of the resulting latex emulsion copolymers, and a calculated glass transition temperature of 54° C. For the coating composition CC7, the resulting latex emulsion had a total solids content of 34.6% by weight, an acid number of 71.9 mg KOH per gram of the resulting latex emulsion copolymers, and a calculated glass transition temperature of 43° C. The resulting latex emulsion copolymers included monomer concentrations as listed below in Tables 10 and 11, respectively.

TABLE 10

| | Percent by weight |
|---|---|
| First-Stage Monomers and Linkage Monomers | |
| Polyermizable Surfactant Monomer | 0.0 |
| Ethyl Acrylate | 40.9 |
| Styrene | 40.9 |
| Methacrylic Acid | 18.2 |
| Glycidyl Methacrylate (GMA) - Linkage Monomers | 0.0 |
| Second-Stage Monomers | |
| Styrene | 66.7 |
| Glycidyl Methacrylate (GMA) | 11.1 |
| Ethyl Acrylate | 22.2 |
| Total Monomers | |
| First-Stage Monomers | 55.0 |
| Linkage Monomers | 0.0 |
| Second-Stage Monomers | 45.0 |

TABLE 11

| | Percent by weight |
|---|---|
| First-Stage Monomers and Linkage Monomers | |
| Polyermizable Surfactant Monomer | 0.0 |
| Ethyl Acrylate | 54.5 |
| Styrene | 27.3 |
| Methacrylic Acid | 18.2 |
| Glycidyl Methacrylate (GMA) - Linkage Monomers | 0.0 |
| Second-Stage Monomers | |
| Styrene | 66.7 |
| Glycidyl Methacrylate (GMA) | 11.1 |
| Ethyl Acrylate | 22.2 |
| Total Monomers | |
| First-Stage Monomers | 55.0 |
| Linkage Monomers | 0.0 |
| Second-Stage Monomers | 45.0 |

As mentioned above, if desired, the process for producing the coating compositions CC6 and CC7 without any external surfactants may also be modified to incorporated linkage group grafting as discussed above for the coating compositions CC1-CC4.

The complete disclosures of the patents, patent documents, and publications cited herein are incorporated by reference to the extent that they do not conflict with the present disclosure. Although the present disclosure has been described with reference to preferred embodiments, workers skilled in the art will recognize that changes may be made in form and detail without departing from the spirit and scope of the disclosure.

The invention claimed is:

1. A coating composition comprising an emulsion polymerized latex, wherein the polymerized latex is a reaction product of a method comprising:
   providing a first-stage copolymer having step-growth-functional groups;
   grafting a linkage monomer to one of the step-growth-functional groups on the first-stage copolymer to provide at least one pendant linkage group bonded to the first stage copolymer; and
   emulsion polymerizing a plurality of second-stage monomers, wherein at least about 5% by weight of the second-stage monomers are chemically different from the first-stage monomers, in the presence of the first-stage copolymer to form a second-stage copolymer chemically different from the first-stage copolymer;
wherein the second-stage copolymer is linked to the first-stage copolymer with a linkage derived from the pendant linkage group; the coating composition is substantially free of structural units derived from each of bisphenol A, bisphenol F, bisphenol S, or any diepoxides thereof; and
the coating composition is suitable for forming an inside spray coating for an aluminum food or beverage can.

2. The coating composition of claim 1, wherein the method comprises grafting the linkage monomers to the step-growth functional groups on the first-stage copolymer to provide a plurality of pendant linkage groups bonded to the first-stage copolymer.

3. The coating composition of claim 1, wherein a plurality of first-stage monomers is emulsion polymerized to form the first stage copolymer.

4. The coating composition of claim 1, wherein the step-growth-functional groups comprise acid-functional groups, alcohol-functional groups, amine-functional groups, or combinations thereof.

5. The coating composition of claim 4, wherein the step-growth-functional groups comprise acid-functional groups, and wherein the acid-functional groups comprise carboxylic acid-functional groups, anhydrides thereof, salts thereof, or combinations thereof.

6. The coating composition of claim 1, wherein the linkage monomer comprises an ethylenically-unsaturated oxirane-functional monomer.

7. The coating composition of claim 6, wherein the linkage monomer comprises glycidyl acrylate, glycidyl methacrylate, or a mixture thereof.

8. The coating composition of claim 1, wherein the first-stage copolymer comprises at least one structural unit produced from a polymerizable surfactant monomer.

9. The coating composition of claim 1, wherein the second-stage copolymer further comprises at least one functional group comprising an oxirane group, an isocyanate group, an azlactone group, an oxazoline group, a cyclocarbonate group, or a combination thereof.

10. The coating composition of claim 1, wherein the second-stage monomers comprise one or more (meth)acrylates, one or more ethylenically-unsaturated aromatic monomers, or combinations thereof.

11. The coating composition of claim 1, wherein at least about 10 wt % of the first-stage monomers are chemically different from the second-stage monomers.

12. The coating composition of claim 1, wherein the second-stage copolymer in the cured coating further comprises a curing group reacted with a step-growth-functional group of the first-stage copolymer.

13. The coating composition of claim 1, wherein the linkage linking the first and second copolymers includes at least one ester linkage, and is connected to the second-stage copolymer with a carbon-carbon covalent bond.

14. The coating composition of claim 1, wherein the linkage between the first-stage copolymer and the second-stage copolymer has a structure selected from the group consisting of:

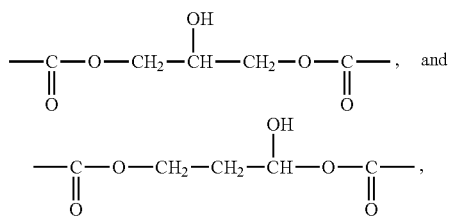

wherein the carbonyl groups are directly bonded to backbone carbon atoms of the first-stage copolymer and the second-stage copolymer, and wherein, optionally, each hydrogen atom of the $CH_2$ and CH groups is independently substituted with a $C_1$-$C_3$ alkyl group.

15. The coating composition of claim 1, wherein the coating composition has a viscosity of about 45 seconds to about 75 seconds, pursuant to ASTM D1200-88 using a Ford Viscosity Cup #2 at 80° F.

16. The coating composition of claim 1, wherein when spray applied onto an interior of a 12 ounce two-piece drawn and ironed aluminum beverage can and cured at 188° C. to 210° C. (measured at the can dome) for 60 seconds to provide a coating with an average film thickness of about 0.9 mg/inch' to about 2.5 mg/inch, exhibits a global extraction result of less than 50 ppm as determined by 21 CFR § 175.300 paragraph (e) (5), wherein ppm values were calculated based on surface area of the can (no end) of 44 square inches with a volume of 355 milliliters.

17. The coating composition of claim 1, wherein when spray applied onto an interior of a 12 ounce two-piece drawn and ironed aluminum beverage can and cured at 188° C. to 199° C. (measured at the can dome) for 60 seconds to provide a coating with an average film thickness of about 0.9 mg/inch$^2$ to about 2.5 mg/inch, exhibits a metal exposure of less than 3 mA on average when the can is filled with 1% NaCl in deionized water and tested pursuant to the Initial Metal Exposure test method disclosed herein.

18. The coating composition of claim 1, wherein the coating composition when spray applied onto an interior of a 12 ounce two-piece drawn and ironed aluminum beverage can and cured at 188° C. to 199° C. (measured at the can dome) for 60 seconds to provide a coating with an average film thickness of about 0.9 mg/inch$^2$ to about 2.5 mg/inch, exhibits wedge bend results of 50% or greater of non-corroded wedge bend length when subjected to the wedge bend test described herein.

19. The coating composition of claim 1, wherein the coating composition is substantially free of (meth)acrylamide monomers.

20. The coating composition of claim 1, wherein the coating composition comprises an inside spray coating for a two-piece drawn and ironed aluminum beverage can.

21. The coating composition of claim 1, wherein the coating composition, when spray-applied onto an interior of a 12 ounce two-piece drawn and ironed aluminum beverage can and cured at 188° C. to 210° C. (measured at the can dome) for 60 seconds, provides an inside spray beverage can coating with an average film thickness of about 0.7 mg/in$^2$ to about 4.0 mg/in$^2$.

22. A method, comprising:
 spraying the coating composition of claim 1 on an interior surface of a food or beverage container; and
 curing the coating composition to form a coating.

23. The method of claim 22, wherein the food or beverage container comprises a 12 ounce two-piece drawn and ironed aluminum beverage can.

\* \* \* \* \*